(12) United States Patent
Hunniford et al.

(10) Patent No.: US 7,285,207 B2
(45) Date of Patent: Oct. 23, 2007

(54) METHODS AND APPARATUS FOR REDUCING NITRATE DEMANDS IN THE REDUCTION OF DISSOLVED AND/OR ATMOSPHERIC SULFIDES IN WASTEWATER

(75) Inventors: David J. Hunniford, Sarasota, FL (US); David L. Morano, Sarasota, FL (US); James Paul Harshman, Bradenton, FL (US)

(73) Assignee: Siemens Water Technologies Holding Corp., Warrendale, PA (US)

( * ) Notice: Subject to any disclaimer, the term of this patent is extended or adjusted under 35 U.S.C. 154(b) by 298 days.

(21) Appl. No.: 11/176,018

(22) Filed: Jul. 7, 2005

(65) Prior Publication Data

US 2005/0242010 A1    Nov. 3, 2005

Related U.S. Application Data

(62) Division of application No. 10/700,381, filed on Nov. 4, 2003, now Pat. No. 7,087,172.

(60) Provisional application No. 60/451,671, filed on Mar. 5, 2003.

(51) Int. Cl.
    *C02F 3/00*    (2006.01)
(52) U.S. Cl. .................. 210/143; 210/739; 210/743; 210/610
(58) Field of Classification Search ............... 210/610, 210/739, 743, 143
    See application file for complete search history.

(56) References Cited

U.S. PATENT DOCUMENTS

| 221,232 A | 11/1879 | Hirsh |
| 1,701,825 A | 2/1929 | Seil |
| 1,997,252 A | 4/1935 | Fischer |
| 3,219,576 A | 11/1965 | Makabe |
| 3,300,404 A | 1/1967 | Howe et al. |
| 3,401,113 A | 9/1968 | Pruessner et al. |
| 3,502,566 A | 3/1970 | Raymond et al. |

(Continued)

FOREIGN PATENT DOCUMENTS

| DE | 34 14556 A1 | 10/1985 |
| JP | 57187099 A | 11/1982 |

OTHER PUBLICATIONS

"Chemical Control of Hydrogen Sulfide From Anaerobic Swine Manure," Canadian Agricultural Engineering, pp. 90-96, vol. 17, No. 2, Dec. 1975.

(Continued)

*Primary Examiner*—Chester T. Barry

(57) ABSTRACT

A method and apparatus for treating wastewater streams by adding, either separately or as a mixture, a nitrate containing compound and an alkaline material in an amount sufficient to achieve a lower concentration of atmospheric hydrogen sulfide and dissolved sulfides downstream of the addition as compared to the atmospheric hydrogen sulfide and dissolved sulfides present in the wastewater stream prior to the addition. By adding alkaline material in addition to a nitrate containing compounds, the amount of nitrate containing compound added can be reduced by at least 10% as compared to the amount of nitrate that would theoretically need to be added in the absence of alkaline material to achieve a comparable lower concentration of atmospheric hydrogen sulfide and dissolved sulfides in the wastewater stream.

17 Claims, 6 Drawing Sheets

U.S. PATENT DOCUMENTS

| | | | |
|---|---|---|---|
| 3,607,736 | A | 9/1971 | Miyaji |
| 3,639,263 | A | 2/1972 | Troschinski et al. |
| 3,867,284 | A | 2/1975 | Kappe et al. |
| 3,930,998 | A | 1/1976 | Knopp et al. |
| 3,959,127 | A | 5/1976 | Bartha et al. |
| 3,959,130 | A | 5/1976 | Kloster et al. |
| 3,966,450 | A | 6/1976 | O'Neil et al. |
| 4,098,690 | A | 7/1978 | Semmens |
| 4,108,771 | A | 8/1978 | Weiss |
| 4,115,258 | A | 9/1978 | Smith et al. |
| 4,148,726 | A | 4/1979 | Smith |
| 4,153,547 | A | 5/1979 | McLean |
| 4,297,216 | A | 10/1981 | Ishida et al. |
| 4,446,031 | A | 5/1984 | List |
| 4,501,668 | A | 2/1985 | Merk et al. |
| 4,505,819 | A | 3/1985 | Barnes et al. |
| 4,566,469 | A | 1/1986 | Semp et al. |
| 4,612,124 | A | 9/1986 | Escrig |
| 4,680,127 | A | 7/1987 | Edmondson |
| 4,681,687 | A | 7/1987 | Mouché et al. |
| 4,725,405 | A | 2/1988 | Cassin et al. |
| 4,760,027 | A | 7/1988 | Sublette |
| 4,818,404 | A | 4/1989 | McDowell |
| 4,911,843 | A | 3/1990 | Hunniford et al. |
| 5,045,213 | A | 9/1991 | Bowers |
| 5,200,092 | A | 4/1993 | Richards et al. |
| 5,298,174 | A | 3/1994 | Momont et al. |
| 5,336,431 | A | 8/1994 | Richards et al. |
| 5,385,842 | A | 1/1995 | Weimer et al. |
| 5,480,550 | A | 1/1996 | Sublette |
| 5,482,630 | A | 1/1996 | Lee et al. |
| 5,500,368 | A | 3/1996 | Tatnall |
| 5,603,832 | A | 2/1997 | Hoyvik et al. |
| 5,833,864 | A | 11/1998 | Miller et al. |
| 5,948,269 | A | 9/1999 | Stone |
| 5,984,993 | A | 11/1999 | Mainz et al. |
| RE36,651 | E | 4/2000 | Hunniford et al. |
| 6,045,695 | A | 4/2000 | Janssen et al. |
| 6,059,973 | A | 5/2000 | Hudson et al. |
| 6,146,522 | A | 11/2000 | Fernholz et al. |
| 6,221,652 | B1 | 4/2001 | Janssen et al. |
| RE37,181 | E | 5/2001 | Hunniford et al. |
| 6,309,597 | B1 | 10/2001 | Ballinger, Jr. et al. |
| 6,410,305 | B1 | 6/2002 | Miller et al. |
| 6,576,144 | B1 | 6/2003 | Vineyard |
| 6,660,163 | B2 | 12/2003 | Miklos |
| 6,773,604 | B2 | 8/2004 | Walton et al. |
| 2002/0102229 | A1 | 8/2002 | Wegner |
| 2004/0173525 | A1 | 9/2004 | Hunniford |
| 2004/0180424 | A1 | 9/2004 | Christiansen |
| 2004/0226891 | A1 | 11/2004 | Dentel |
| 2005/0115895 | A1 | 6/2005 | Simpson et al. |

OTHER PUBLICATIONS

"Sewage Works Journal," published by California Sewage Works Association, Jul. 1946, vol. XVIII, No. 1, pp. 34-45.

"Industrial Odor Technology Assessment," Ann Arbor Science Publishers Inc., pp. 117-147, 1956.

"Process Design Manual for Sulfide Control In Sanitary Sewerage Systems", U.S. Environmental Protection Agency, Oct. 1974, pp. 5-34 and 5-35.

Bryan, A.C., "Experiences With Odor Control at Houston Texas", Sew. & Ind. Wastes, 28, 1512 (1956).

Carpenter, W.T. "Sodium Nitrate Used to Control Nuisance", Water Works and Sew., 79, 175 (1932).

Eliassen, R., et al., "The Effect of Chlorinated Hydrocarbons on Hydrogen Sulfide Production", Sew. Works Jour., 21, 457 (1949).

Fales, A.L., "Treatment of Industrial Wastes from Paper Mills and Tannery on Neponset River", Jour. Ind. Eng. Chem., 21, 216 (1929).

Heukelekian, H., "Effect of the Addition of Sodium Nitride to Sewage on Hydrogen Sulfide Production and B.O.D. Reduction", Sewage Works Journal 15(2):255-261 (1943).

Heukelekian, H., "Some Bacteriological Aspects of Hydrogen Sulfide Production from Sewage", Sew. Works Jour. 20, 490 (1948).

Lawrance, W.A., "The Addition of Sodium Nitrate to the Androscoggin River", Sew and Ind. Wastes, 22, 820 (1950).

Lorgan, G.P., et al., "Nitrate Addition for the Control of Odor Emissions from Organically Overloaded, Super Rate Trickling Filters", 33rd Ann. Purdue Ind. Wast Conf., West Lafayette, Ind., (1978).

McKinney, R.E., "The Role of Chemically Combined Oxygen in Biological Systems", Jour. San. Eng. Div., proc. Amer. Soc. Civil Engr., 82 SA4, 1053 (1956).

Poduska, R.A., "Operation, control, and Dynamic Modeling of the Tennessee Eastman Company Industrial Wastewater Treatment System", 34th Ann. Purdue Indust. Waste Conf., Lafayette, Md. (1970).

Pomery, R.D., "Controlling Sewage Plant Odors", Consulting Eng., Feb. 101 (1963).

Pomeroy, R.D., et al., "Sulfide Occurrence and Control in Sewage Collection System", U.S. Enviromental protection Agency, EPA 600/X-85-052, Cincinnati, Ohio (1985).

Prakasam, T.B.S., et al., "Microbial Dentrification of a Wastewater Containing high Concentrations of Oxidized Nitrogen", Proceedings of the 31st Industrial Wst Conference, May 4-6, 1976, Purdue University.

Price, E.C., et al., "Sewage Treatment Plants Combat Odor Pollution Problems", Water and Sew. Works, 125, 10, 64 (1978).

Reid, G.W., et al., "Sewer Odor Studies", Sew. and Ind. Wstes, 28, 991 (1956).

Ryan, W.A., "Experiences with Sodium Nitrate Treatment of Cannery Wastes", Sew. Works Jour., 17, 1227 (1945).

Santry, I.W., Jr., "Hydrogen Sulfide Odor Control Measures", Jour. Water Poll. Control Fed., 38 459 (1966).

Santry, I.W., Jr., "Hydrogen Sulfide In Sewers", Jour. Water Poll, Control Fed., 35, 1580 (1963).

"Standard Methods for the Examination of Water and Wastewater", 14th Ed., Amer. Pub. Health Assn., Wash. D.C., 499-509 1976).

Peter R. Willenbring et al., "Calcium Nitrate" (incomplete title), Oct. 1988 or earlier.

"Biochemical Oxidation of Polluted Lake Sediment with Nitrate—A new Lake Restoration Method", 1976.

R.R. Dague, "Fundamentals of Odor Control", Journal Water Pollution Control Federation, 44(4): 583-594; Apr. 1972.

William H. Moss et al., "Full-Scale use of physical/chemical treatment of domestic wastewater at Rocky River, Ohio", Journal Water Pollution Control Federation, 49(11): 2,249-2,254; Nov. 1977.

Leon S. Directo et al., "Pilot plant Study of physical-chemical treatment", Journal Water Pollution Control Federation,649(1)):2,081-2,098; Oct. 1977.

Richard A. Poduska et al., "Successful storage lagoon odor control", Journal Water Pollution Control Federation, 53(3):299,310; Mar. 1981.

Pomeroy, Johnston and Bailey, "Process Design Manual For Sulfide Control in Sanitary Sewage Systems", Oct. 1974.

Basic Research On Sulfide Occurrence and Control In Sewage Collection Systems, National Technical Information Service, a-5 (Feb. 28, 1969).

Beardsley, C.W., et al., "Removal of Sewer Odors By Scrubbing With Alkaline Solutions", Sewage and Industrial Wastes, vol. 30, 220 (1958).

Lang, M., "Chemical Control of Water Quality In A Tidal Basin", Journal WPCF, 1414-1416 (1966).

Sanborn, N.H., "Nitrate Treatment of Cannery Waste", The Fruit Products Journal and American Vinegar Industry, (1941).

"Methods For Chemical Analysis of Water and Wastes", U.S. Environmental Protection Agency, (1974).

Painter, H.A., "A Review of Literature on Inorganic Nitrogen Metabolism in Microorganisms", Water Research, The Journal of the International Association on Water Pollution Research, vol. 4, No. 6, (1970).

Pomeroy, R.D., et al., "Feasibility Study on In-Sewer Treatment Methods", Municipal, Environmental Research Lab, Chapter 6, "Chemical Treatment", 77 (1977).

Thistlethwayte, D.K.B., "The Control of Sulphides In Sewerage Systems", Ann Arbor Science Publishers Inc., Chapter 13, "Corrective Measures For Existing Systems", 159 (1972).

"Water Supply and Sewerage", Ernest W. Steel, Chapter 27, pp. 600-601 (4th Ed. 1960).

"Effect of Nitrate on Biogenic Sulfide Production," Applied and Environmental Microbiology, Jun. 1986, vol. 51, No. 6, pp. 1205-1211 (7 pages).

"Odor and Corrosion Control in Sanitary Sewage Systems and Treatment Plants," EPA Design Manual, Oct. 1985, pp. 53, 60, 71, 75, 76.

"Odor Control and Olfaction," Pollution Sciences Publishing Company, pp. 85, 454, 457, undated.

Patent Abstracts of Japan, Publication No. 11156374, Publication date: Dec. 15, 1998, Application Date: May 30, 1997, Application No. 09141422, Applicant: Itochu Corp., Inventor: Masuko Mitsuhiro, Title: Method and Apparatus for Controlling Injection of Hydrogen Sulfide Removing Agent.

Patent Abstracts of Japan, Publication No. 10328676, Publication Date: Dec. 15, 1998, Application Date: May 30, 1997, Application No. 09141422, Applicant: Itochu Corp., Inventor: Masuko Mitsuhiro, Title: Method and Apparatus for Controlling Injection of Hydrogen Sulfide Removing Agent.

"Odor and Corrosion Control in Sanitary Sewerage Systems and Treatment Plants," Copyright 1989, ISBN 0-8155-1192-2, pp. 59 and 60.

US 7,285,207 B2

METHODS AND APPARATUS FOR REDUCING NITRATE DEMANDS IN THE REDUCTION OF DISSOLVED AND/OR ATMOSPHERIC SULFIDES IN WASTEWATER

RELATED APPLICATIONS

This application is a division of U.S. patent application Ser. No. 10/700,381, filed Nov. 4, 2003, now U.S. Pat. No. 7,087,172 entitled METHODS AND APPARATUS FOR REDUCING NITRATE DEMANDS IN THE REDUCTION OF DISSOLVED AND/OR ATMOSPHERIC SULFIDES IN WASTEWATER, which claims the benefit under 35 U.S.C. §119(e) to commonly-owned U.S. provisional patent application Ser. No. 60/451,671, entitled PROCESSES AND SYSTEMS TO REDUCE NITRATE DEMANDS FOR THE REDUCTION OF DISSOLVED SULFIDES IN WASTEWATER SYSTEMS, filed on Mar. 5, 2003, each of which is hereby incorporated by reference in its entirety.

FIELD OF THE INVENTION

The present invention relates to processes and systems which effect removal of dissolved hydrogen sulfide in wastewaters (for example, sewer systems, municipal waste treatment plants, industrial wastewaters and the like) by the addition of nitrate ions. More particularly, the present invention relates to processes and systems whereby nitrate demands for reducing dissolved sulfides in such wastewaters are lower than for nitrate only treatment.

DESCRIPTION OF THE RELATED ART

It is well known to add nitrates or nitrites, and/or anthraquinone, to sewage to suppress the formation of dissolved sulfides via anaerobic bacterial action. In this regard, see U.S. Pat. Nos. 3,300,404; 4,446,031; 4,681,687; 5,386,842; and 5,500,368 (the entire content of each being expressly incorporated hereinto by reference).

Recently, it has been proposed via commonly owned U.S. Pat. Nos. Re 37,181 and Re 36,651 (the entire content of each is expressly incorporated hereinto by reference) that the addition of nitrate, typically via an aqueous nitrate salt solution, to sewage systems, waste treatment plants and other industrial waste applications containing dissolved sulfides will result in the elimination or substantial reduction of the sulfides, as well as the elimination of other minor odors associated with other sulfur-containing compounds. It is also known that significantly raising the pH of wastewater streams (i.e., to greater than 10) by addition of an alkaline material (i.e. sodium hydroxide, calcium hydroxide) causes significant reduction of biological activity that produces dissolved sulfide.

Unfortunately, this significant pH increase of wastewater can adversely affect operation of wastewater treatment plants. Alkali addition also causes a shift in the dissolved sulfide equilibrium, so that more of the volatile dissolved hydrogen sulfide ($H_2S$) is converted into nonvolatile sulfide ion ($S^{2-}$), thereby preventing release of hydrogen sulfide gas. However, hydrogen sulfide can still be stripped downstream (i.e. released to the atmosphere) as untreated additional flows become mixed with the alkaline treated wastewater, thereby reducing its pH, and nonvolatile sulfide ion is converted back to volatile dissolved hydrogen sulfide. As a result, operating a wastewater system at such a high pH level does not typically allow for satisfactory odor control on a continuous basis.

SUMMARY OF THE INVENTION

It has now been discovered that the minor addition of alkaline material theoretically sufficient to raise the wastewater pH typically only to 7.5 to 9 surprisingly results in a reduction of at least about 10% (typically between about 20% to about 50%) of nitrate containing compounds in any form that must be added to the stream to significantly reduce or eliminate dissolved sulfides downstream of the addition point as compared to the amount needed in the absence of the co-addition of alkaline material. As a result, this process provides for a substantial reduction in the dosage of nitrate containing compounds necessary to achieve substantial reduction of dissolved sulfides in wastewater stream and hence providing satisfactory odor control with significantly lower nitrate consumption.

In accordance with especially preferred embodiments of the present invention, the nitrate containing compound and an alkaline material may be added in sufficient amounts so as to reduce concentrations of atmospheric hydrogen sulfide and dissolved sulfides in the wastewater stream at least about 10%, more typically about 20% and most typically at least about 50%, as compared to the concentrations of atmospheric hydrogen sulfide and dissolved sulfides present in the wastewater stream prior to the nitrate containing compound and alkaline material addition. The particular concentration reduction of atmospheric hydrogen sulfide and dissolved sulfides that may be obtained will depend on a variety of environmental considerations associated with the wastewater collection or treatment system in which the present invention is utilized. Thus, under some circumstances, it may be feasible to substantially eliminate atmospheric hydrogen sulfide and dissolved sulfides from the wastewater stream by means of the co-addition of nitrate and alkaline material in accordance with the present invention.

According to one aspect of the present invention, a method for treating a wastewater stream is provided. In one embodiment, the method consists essentially of acts of (a) adding, at a first position in the wastewater stream, a nitrate containing compound to the wastewater stream in an amount sufficient to reduce a concentration of at least one of atmospheric hydrogen sulfide and dissolved sulfide downstream of the first position to a desired concentration, and (b) adding, at a second position in the wastewater stream, a compound consisting essentially of an alkaline material to the wastewater stream to reduce the amount of the nitrate containing compound added in act (a).

According to another embodiment of the present invention, a method for use in a wastewater treatment system that adds an amount of a nitrate containing compound to a wastewater stream at a first position in the wastewater stream to reduce a concentration of at least one of atmospheric hydrogen sulfide and dissolved sulfide downstream of the first position to a desired concentration is provided. The method, consists essentially of adding, at a second position in the wastewater stream, an amount of a compound consisting essentially of an alkaline material to the wastewater stream to reduce the amount of the nitrate containing compound used to reduce the concentration of the at least one of the atmospheric hydrogen sulfide and the dissolved sulfide to the desired concentration.

According to another embodiment of the present invention, a method of treating a wastewater stream is provided.

The method comprises acts of adding a nitrate containing compound at a first position in the wastewater stream, adding an alkaline material at a second position in the wastewater stream; sensing a level of at least one of atmospheric hydrogen sulfide, dissolved sulfide, pH, and residual nitrate in the wastewater stream downstream of the first and second positions; and adjusting an amount of at least one of the nitrate containing compound and the alkaline material added to the wastewater stream in response to the act of sensing. Advantageously, one or more of the afore-mentioned acts of each of the above-described embodiments may be implemented manually, for example, by an operator, or by a computer.

According to another aspect of the present invention, a wastewater treatment system is provided. The wastewater treatment system comprises a nitrate source in fluid communication with the wastewater, an alkaline material source in fluid communication with the wastewater, and at least one sensor, disposed in the wastewater downstream of the nitrate source and the alkaline material source, to measure a level of at least one of atmospheric hydrogen sulfide, dissolved sulfide, pH, and residual nitrate downstream of the nitrate source and the alkaline material source. The wastewater treatment system further comprises means, responsive to the measured level of the at least one of atmospheric hydrogen sulfide, dissolved sulfide, pH, and residual nitrate downstream of the nitrate source and the alkaline material source, for reducing an amount of nitrate and/or alkaline material that is added to the wastewater to reduce the level of the at least one of atmospheric hydrogen sulfide and dissolved sulfide downstream of the nitrate source and the alkaline material source to a desired level.

According to yet another aspect of the present invention, a computer readable medium is provided. The computer readable medium is encoded with a program that, when executed on a processor of a computer, performs a method of treating a wastewater stream, comprising acts of adding a nitrate containing compound at a first position in the wastewater stream, adding an alkaline material at a second position in the wastewater stream, sensing a level of at least one of atmospheric hydrogen sulfide, dissolved sulfide, pH, and residual nitrate in the wastewater stream downstream of the first and second positions, and adjusting an amount of at least one of the nitrate containing compound and the alkaline material added to the wastewater stream in response to the act of sensing.

Advantageously, embodiments of the present invention permit substantial reductions in the amount of nitrate containing compound that is added to a wastewater stream to prevent and/or reduce atmospheric hydrogen sulfide and dissolved sulfide irrespective of whether the alkaline material is added separately to the wastewater stream, or in combination with the nitrate containing compound. Accordingly, embodiments of the present invention may be readily adapted for use with existing wastewater treatment facilities and systems, as well as wastewater treatment facilities being planned for use in the future.

BRIEF DESCRIPTION OF THE DRAWINGS

This invention is pointed out with particularity in the appended claims. The above and further advantages of this invention may be better understood by referring to the following description when taken in conjunction with the accompanying drawings in which similar reference numbers indicate the same or similar elements.

In the drawings.

DEFINITIONS

Figure 1:
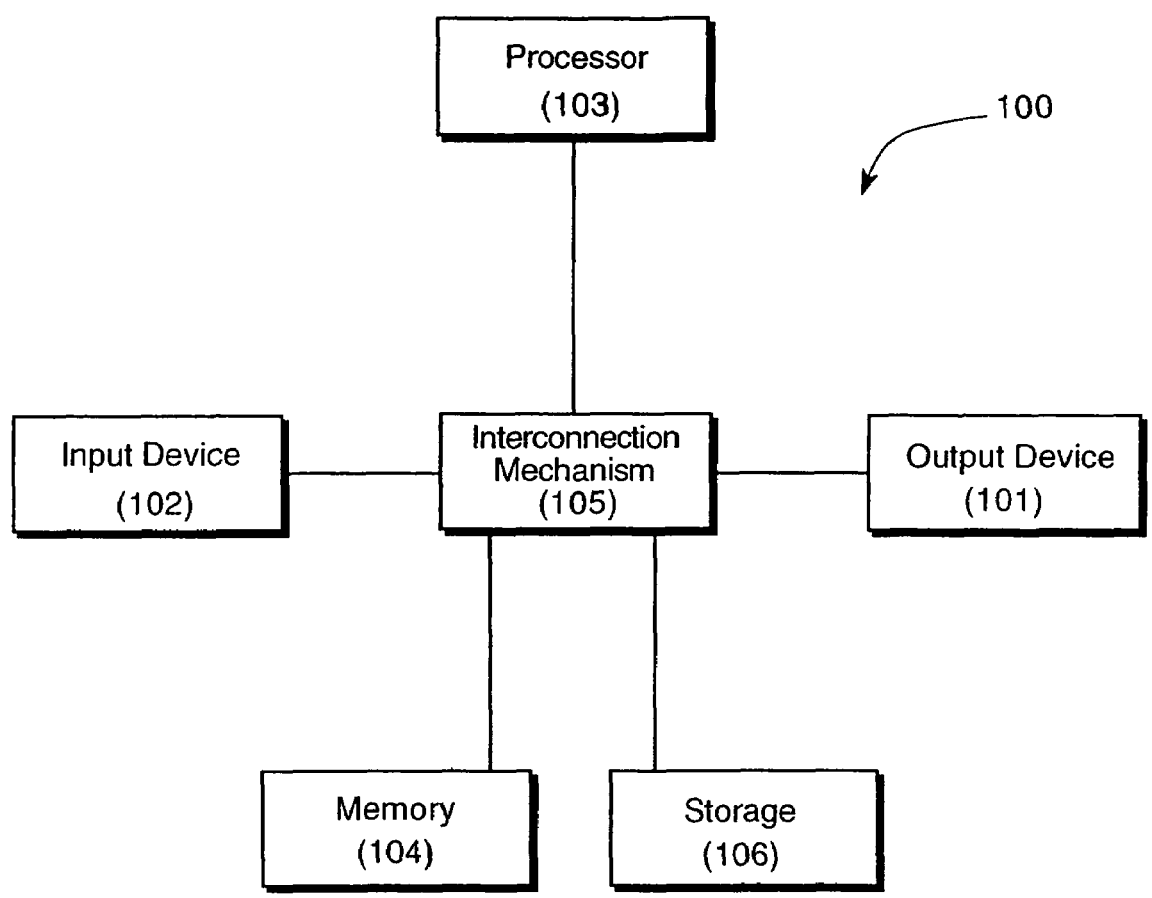
FIG. 1 shows a general purpose computer system upon which various embodiments of the invention may be practiced.

As used herein, "wastewater" is defined as waters from municipal, oilfield and industrial operations containing sulfate-reducing bacterial and denitrifying (nitrate reducing) bacteria and which are susceptible to the generation of biogenic hydrogen sulfide ($H_2S$) due to the growth and activity of the sulfate-reducing bacteria. They include water streams resulting from municipal use, petroleum and natural gas production operations, seawater used in oilfield water-flood operations, effluent waters from chemical and biochemical processing and paper and pulp operations, bio-solid treatment applications, and water used in industrial heat transfer operations.

As used herein, the term "wastewater stream" is used to refer to a flow of wastewater, typically through a conduit, or series of conduits that may be interconnected via one or more pumps or lift-stations, but also to refer to an amount of wastewater stored in a collection vessel, such as a tank, at two distinct points in time.

As used herein, the terms "wastewater treatment system" and "wastewater treatment facility" refer to any wastewater collection and/or treatment system or facility in which wastewater is treated or processed to prevent, remove, or reduce undesirable constituents present in the wastewater.

As used herein, the term "feed point" refers to that point in the wastewater stream where nitrate containing compounds or nitrate containing compounds and alkaline material are added to the wastewater stream.

As used herein, the term "test point" refers to that point in the wastewater stream wherein base-line sensor data measurement (e.g., pH, dissolved sulfide concentration, atmospheric hydrogen sulfide concentration, residual nitrate concentration, etc.) is performed. For convenience, the test point may often be in the same general location as the feed point.

As used herein, the term "monitoring point" refers to that point in the wastewater stream, downstream of the feed point, wherein sensor data measurement (e.g., pH, dissolved sulfide concentration, atmospheric hydrogen sulfide concentration, residual nitrate concentration, etc.) of the treated wastewater stream is performed.

As used herein, the term "control point" refers to that point in the wastewater stream, downstream of the feed point, wherein metrics (such as, for example, levels of atmospheric hydrogen sulfide, dissolved sulfide, and residual nitrate) for the treated wastewater stream are established. Frequently, the control point may be the same location as one of the monitoring points.

As used herein the term "point" is used in both a spatial sense and in a temporal sense. Specifically, for a wastewater stream that flows along a distance, for example through a conduit, the term "point" refers to a location along that distance or conduit. For a wastewater stream that is stored in a collection vessel, the term "point" is used in a temporal sense, such that two different points are spaced apart in time, but not necessary in space.

As used herein, the term "detention time" refers to the amount of time between the feed point and the monitoring point, or where the wastewater stream is stored in a collection vessel, the amount of time to turn over the volume of the vessel.

As used herein, "plurality" means two or more.

As used herein, whether in the written description or the claims, the terms "comprising," "including," "carrying," "having," "containing," "involving," and the like are to be understood to be open-ended, i.e., to mean "including but not limited to." Only the transitional phrases "consisting of" and "consisting essentially of," respectively, shall be closed or semi-closed transitional phrases, as set forth, with respect to claims, in the United States Patent Office Manual of Patent Examining Procedures (Original Eighth Edition, August 2001), Section 2111.03.

DETAILED DESCRIPTION

Figure 3:
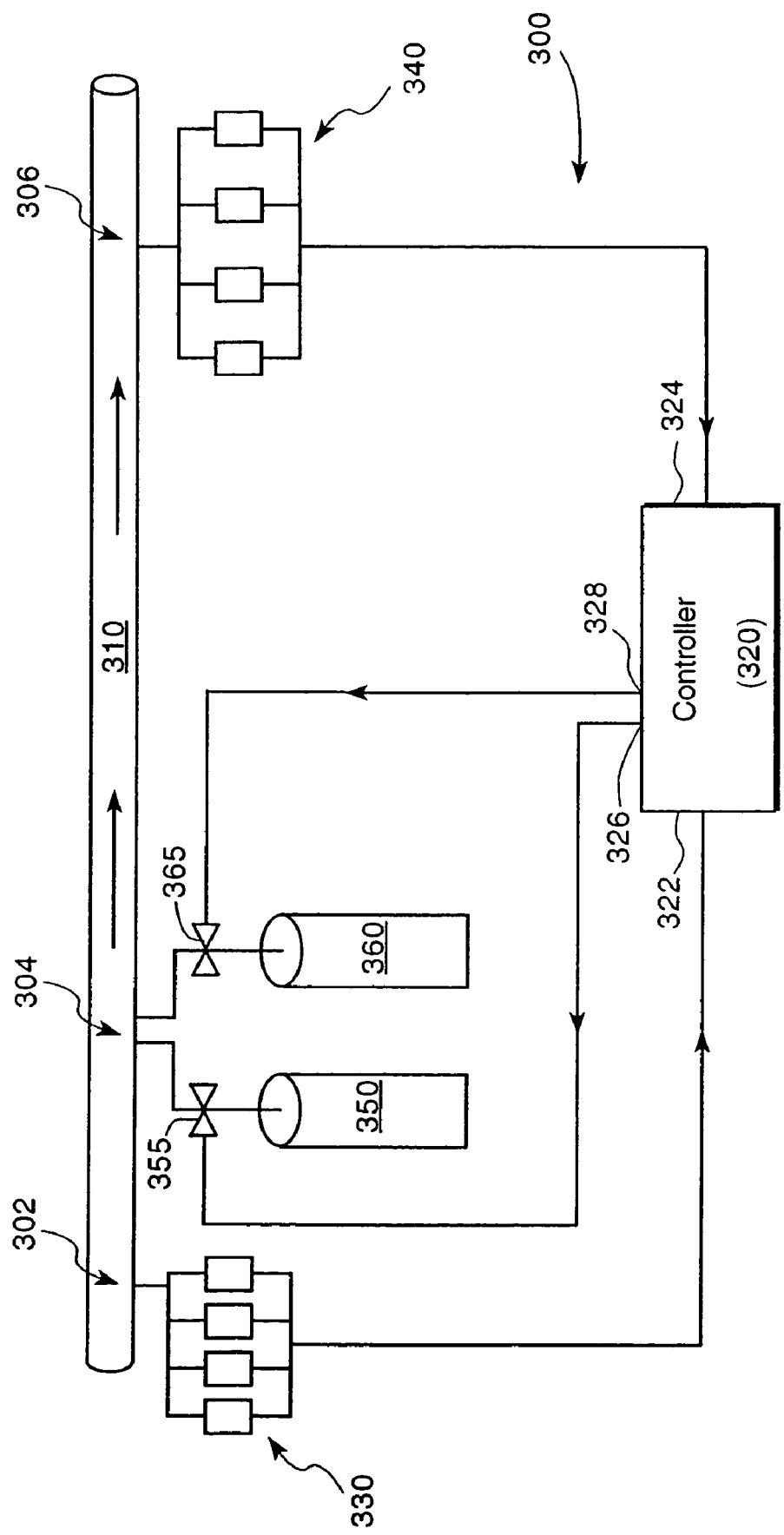
FIG. 3 illustrates a wastewater treatment system according to one embodiment of the present invention.

FIG. 3 illustrates a wastewater treatment system according to one embodiment of the present invention. As shown in FIG. 3, the wastewater treatment system 300 includes a pipe or conduit 310 through which a flow of wastewater flows in the direction indicated. A plurality of upstream sensors 330 are disposed in fluid (e.g. liquid and/or gaseous) communication with the incoming wastewater stream at a test point 302 upstream of a feed point 304, wherein sulfide controlling compounds, such as nitrate containing compounds and alkaline material are introduced. A plurality of downstream sensors 340 are disposed in fluid communication with the wastewater stream at a monitoring point 306 that is located downstream of the feed point 304. The plurality of upstream and downstream sensors 330, 340 are electrically connected to a controller 320, that, dependent upon measurement signals provided by the sensors, adjusts the amount of nitrate containing compound and/or alkaline material added to the incoming wastewater stream at the feed point 304. For example, based upon parameters of the wastewater stream as measured by the upstream and downstream sensors 330, 340, the controller 320 adjusts the amount and/or rate of nitrate containing compound, alkaline material, or both added to the wastewater stream, as discussed further below with respect to FIG. 6.

Although the plurality of upstream sensors 330 are shown in FIG. 3 as being disposed at a distance upstream of the feed point 304, it should be appreciated that the present invention is not so limited. For example, where access to the wastewater stream is limited, the upstream sensors 330 may be physically disposed in the same general location as the feed point 304 wherein the sulfide controlling compounds are introduced to the wastewater stream. Moreover, it should be appreciated that one or more of the plurality of upstream sensors 330 may be located at a different position in the wastewater stream than the others. Similarly, although the downstream sensors 340 are shown as being disposed at a position well downstream of the feed point 304, the location of these sensors may vary dependent upon the accessibility of the wastewater stream, as well as other factors such as the flow rate of the wastewater stream and the level of sulfides present in the wastewater stream. Although only one monitoring point 306 is depicted in FIG. 3, it should be appreciated that additional monitoring points may also be provided, as illustrated by Example 6, discussed in detail further below.

In general, the distance between the feed point 304 and the monitoring point 306 should be such that at the particular flow rate of the wastewater stream, a sufficient amount of time (termed the "detention time") is provided to enable micro-organisms in the wastewater stream to biochemically reduce the nitrate containing compound to nitrogen gas. This detention time may vary depending upon the level of sulfides present in the untreated wastewater stream, and the temperature and pH of the incoming wastewater stream. Applicants have found that a detention time of at least 15 minutes; and, more preferably, at least 30 minutes; and, still more preferably, at least one hour, is generally sufficient to allow an appreciable reduction in the level of sulfides present in the wastewater stream through the process of biochemical nitrate reduction. In Example 3 (discussed in detail further below), a distance of approximately one mile between the feed point and the monitoring point corresponded to a detention time of approximately 90 minutes, and was sufficient to result in a significant decrease in the level of atmospheric hydrogen sulfide and dissolved sulfides downstream of the feed point.

It should be appreciated that in other wastewater treatment systems, there may be no separation, in terms of physical distance, between the test point 302, the feed point 304, and the monitoring point 306. For example, in wastewater treatment systems wherein the untreated wastewater is stored in a collection vessel and then treated and released (e.g., bio-solid treatment applications), the test point 302, the feed point 304, and the monitoring point 306 may all coincide in space, but be separated in time. Indeed, in this type of wastewater treatment system, the upstream and downstream sensors may be the same physical sensors, but used to measure parameters of the wastewater at different times, before and after the introduction of sulfide controlling and/or reducing compounds.

The plurality of upstream sensors 330 may include a sensor for measuring the pH of the incoming wastewater stream, a sensor for measuring the level or concentration of liquid phase sulfide present in the incoming wastewater stream, a sensor for measuring the level or concentration of atmospheric hydrogen sulfide present in the wastewater stream, or a combination of one or more such sensors. Additional upstream sensors may also be included, for example, a temperature sensor for measuring the temperature of the incoming wastewater stream, and/or a transducer for measuring the flow rate of the incoming wastewater stream. In general, the plurality of upstream sensors 330 will include a sensor for measuring the pH of the incoming wastewater stream and a sensor for measuring the level of liquid phase sulfides present in the incoming wastewater stream, although other additional sensors are preferably provided.

The plurality of downstream sensors 340 may include sensors similar to those disposed at the test point 302. Preferably the plurality of downstream sensors 340 includes a sensor for measuring the level or concentration of liquid phase sulfide present in the treated wastewater stream, a sensor for measuring the level or concentration of atmospheric hydrogen sulfide present in the treated wastewater stream, and a sensor for measuring the amount of residual nitrate present in the treated wastewater stream. Additional sensors such as a pH sensor, a temperature sensor, or a combination of one or more such sensors may also be provided.

As shown in FIG. 3, each of the plurality of upstream and downstream sensors 330, 340 is electrically coupled to a controller 320, which may, for example, be a general purpose computer system, such as a personal computer or workstation. Signals from each of the plurality of upstream sensors 330 are received on an input 322 of the controller 320, and signals from each of the plurality of downstream sensors 340 are received on an input 324 of the controller 320. Based at least in part upon the signals received from the upstream and downstream sensors, the controller 320 determines whether the current feed rate of alkaline material and nitrate containing compound is optimal, and if not, adjusts them accordingly.

Although the signals from the upstream and downstream sensors are depicted in FIG. 3 as being provided to the controller 320 over a single line, it should be appreciated that the present invention is not so limited. For example, rather than being multiplexed together in the manner depicted in FIG. 3, the signals from each of the upstream and downstream sensors may alternatively be provided to the controller 320 over separate lines, one for each sensor. Further, where the signals provided by the upstream and/or downstream sensors are not in a form that can be directly utilized by the controller 320, appropriate signal conversion equipment (not shown) may be provided. As the details of communicating sensor signals to a controller are well understood by those skilled in the art, further discussion of such details is omitted herein.

A source of nitrate containing compound 350 is fluidly connected to the pipe or conduit 310 via a metering valve and/or pump 355, and a source of alkaline material 360 is fluidly connected to the pipe or conduit 310 via a metering valve and/or pump 365. As described in further detail with respect to FIG. 6, based at least in part upon measurements provided by the upstream and downstream sensors 330, 340, each of the metering valves/pumps receives a separate control signal from the controller 320 that determines the amount and/or rate of nitrate containing compound or alkaline material added to the wastewater stream. Specifically, metering valve and/or pump 355 receives a control signal from output 326 of the controller 320 and metering valve or pump 365 receives a separate control signal from output 328 of the controller 320.

According to one embodiment of the present invention, and where the nitrate containing compound and the alkaline material are provided from separate sources, the nitrate containing compound preferably includes calcium nitrate and the alkaline material preferably include sodium hydroxide. Although other types of nitrate containing compounds such as potassium nitrate and sodium nitrate may alternatively be used, calcium nitrate provides nearly twice as much nitrate-based oxygen in solution (approximately 3.5 lbs/gallon) as sodium nitrate (approximately 2 lbs/gallon), thereby reducing transportation and storage costs associated with the nitrate containing compound. Similarly, although other types of alkaline material, for example, calcium hydroxide or potassium hydroxide may be used, sodium hydroxide solution is generally preferred for the source of alkaline material, as it is readily available and relatively inexpensive.

The relative amounts of the nitrate containing compound and the alkaline material added to the incoming wastewater stream will, of course, vary depending upon parameters of the incoming wastewater stream (e.g., the temperature and pH of the incoming wastewater stream, and the levels of atmospheric hydrogen sulfide and dissolved sulfide present in the incoming wastewater stream), and the desired metrics of the treated wastewater stream (e.g., the levels of atmospheric hydrogen sulfide and dissolved sulfide present in the treated wastewater stream at the control point). However, Applicants have empirically determined that for most wastewater streams, a molar ratio of the amount of alkaline material relative to the amount of the nitrate containing compound of between approximately 0.5 to 1 and 2 to 1 is sufficient to substantially reduce or eliminate atmospheric hydrogen sulfide and dissolved sulfide present in the treated wastewater stream.

Because separate sources of nitrate containing compound and alkaline material are provided, the wastewater treatment system 300 can be readily optimized to meet the treatment demands of the incoming wastewater. For example, where parameters of the incoming wastewater stream vary significantly during the day, the amount, the rate, and/or the timing of addition of nitrate containing compound and/or alkaline material may be varied independently of one another to achieve desired levels of atmospheric hydrogen sulfide and liquid phase sulfide in the treated wastewater stream. Such a highly configurable system as this would be economically warranted for larger wastewater treatment plants, wherein the cost of the raw materials (nitrate containing compound and alkaline material) form a substantial portion of the operating costs.

Figure 4:
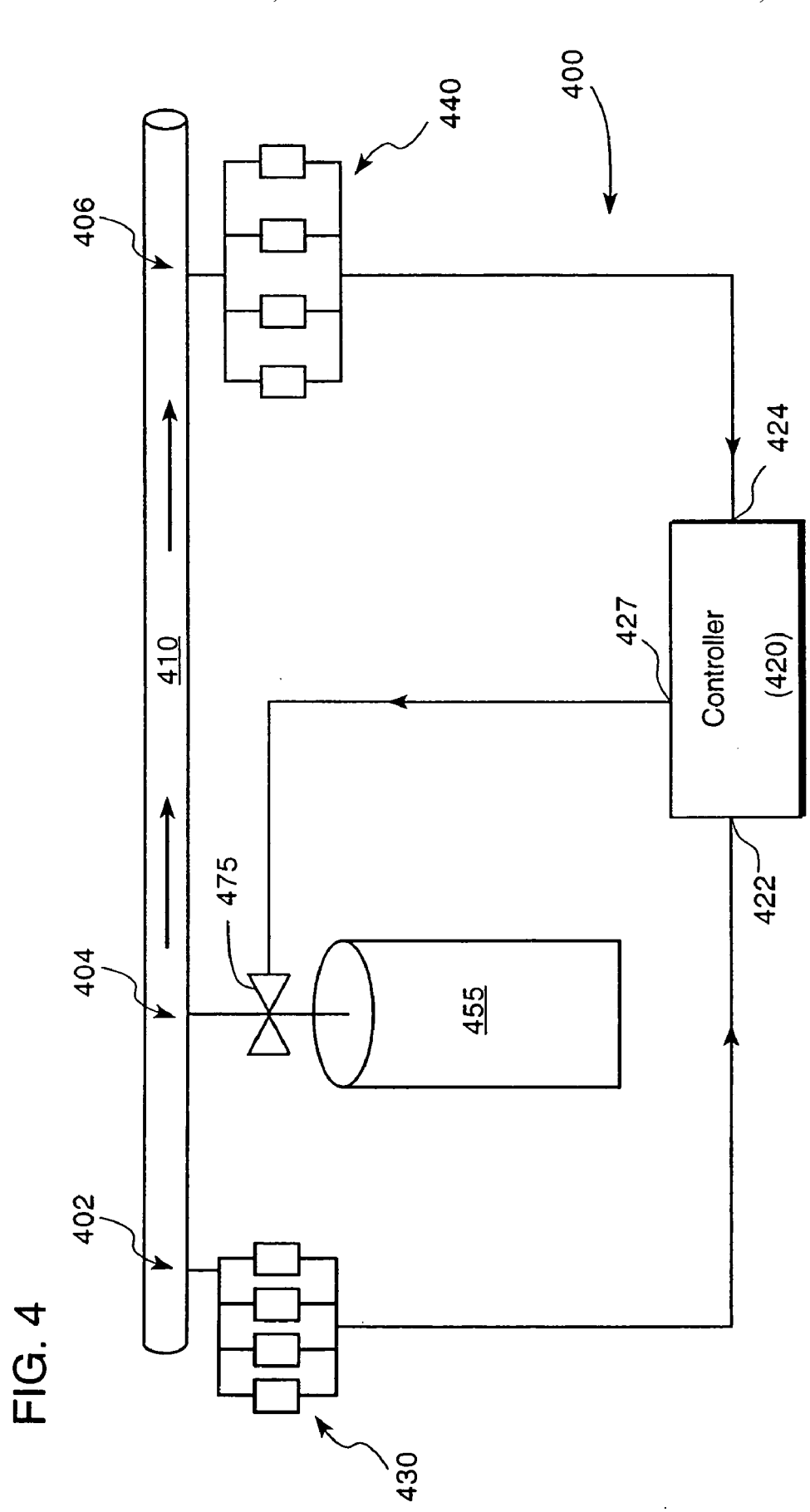
FIG. 4 illustrates a wastewater treatment system according to another embodiment of the present invention.

FIG. 4 illustrates a wastewater treatment system according to another embodiment of the present invention. The wastewater treatment system 400 shown in FIG. 4 is similar to wastewater treatment system 300 of FIG. 3, in that it includes a fluid pipe or conduit 410 through which wastewater flows, a plurality of upstream sensors 430 disposed in fluid (e.g. liquid and/or gaseous) communication with the incoming wastewater stream at a test point or test position 402, a plurality of downstream sensors 440 disposed in fluid communication with the wastewater stream at a monitoring point or position 406, and a controller 420 that is electrically connected to the plurality of upstream and downstream sensors 430, 440. As in the previously described embodiment, additional monitoring points (not shown) may also be provided.

However, in contrast to the wastewater treatment system 300 of FIG. 3, the wastewater treatment system 400 includes only a single source 455 of sulfide controlling compounds that, according to an embodiment of the present invention, includes a mixture of nitrate containing compound and alkaline material mixed together. Such a wastewater treatment system such as shown in FIG. 4 may be more suitable for smaller wastewater treatment facilities, wherein the cost of raw materials is less significant, or where separate storage facilities are not practicable.

The single source of sulfide controlling compounds 455 is fluidly connected to the wastewater stream at feed point 404 via a metering valve and/or pump 475. Based at least in part upon parameters of the wastewater stream measured by the upstream and downstream sensors, the controller 420 adjusts the amount and/or rate of the mixture of nitrate containing compound and alkaline material added to the wastewater stream at the feed point 404. For example, where appreciable levels of sulfides are present in the incoming wastewater stream and the level of atmospheric hydrogen sulfide and/or liquid phase sulfide at the monitoring point is above that desired, additional amounts of the mixture of nitrate containing compound and alkaline material may be added to the incoming wastewater stream.

As in the previously described embodiment, the plurality of upstream sensors 430 may include a sensor for measuring the pH of the incoming wastewater stream, a sensor for measuring the level or concentration of liquid phase sulfide present in the incoming wastewater stream, a sensor for measuring the level or concentration of atmospheric hydrogen sulfide present in the wastewater stream, or a combination of one or more such sensors. Additional upstream sensors may also be included, such as, for example, a temperature sensor for measuring the temperature of the incoming wastewater stream, and/or a transducer for measuring the flow rate of the incoming wastewater stream, etc. As in the previous embodiment, the plurality of upstream sensors 430 will generally include a sensor for measuring the pH of the incoming wastewater stream and a sensor for measuring the level of liquid phase sulfides present in the incoming wastewater stream, although other additional sensors are preferably provided. As in the previous embodiment, one or more of the plurality of upstream sensors 430 may be disposed in a different position in the wastewater stream than the others.

The plurality of downstream sensors 440 may generally include sensors similar to those of the previously described embodiment of FIG. 3. Preferably the plurality of downstream sensors 440 includes a sensor for measuring the level or concentration of liquid phase sulfide present in the treated wastewater stream, and a sensor for measuring the level or concentration of atmospheric hydrogen sulfide present in the treated wastewater stream. It should be appreciated that because the amount of nitrate containing compound and alkaline material cannot be varied independently of one another, a sensor for measuring the amount of residual nitrate present in the treated wastewater stream need not be provided and may be dispensed with. Additional sensors such as a pH sensor, a temperature sensor, or a combination of one or more such sensors may also be provided.

According to one embodiment of the present invention, where the nitrate containing compound and the alkaline material are mixed together and provided from a combined source, the nitrate containing compound preferably includes sodium nitrate and the alkaline material preferably includes sodium hydroxide. Although other types of nitrate containing compounds such as potassium nitrate and calcium nitrate may alternatively be used, Applicants have empirically determined that sodium nitrate is stable in solution to approximately 22° F. when mixed with a 50% caustic solution of alkaline material and water. This is in contrast to calcium nitrate which formed calcium hydroxide precipitate when mixed with a caustic solution of sodium hydroxide. Further, sodium nitrate is readily and economically available, and costs less than other forms of nitrate containing compounds. Although other types of alkaline material may be used, sodium hydroxide is again preferred as a source of alkaline material, as it is a readily available and inexpensive.

The relative amounts of the nitrate containing compound and the alkaline material in the mixture will again vary depending upon parameters of the incoming wastewater stream, and the desired metrics of the treated wastewater stream, as previously discussed with respect to FIG. 3. However, for most wastewater streams, Applicants have empirically determined that a molar ratio of the amount of alkaline material relative to the amount of the nitrate containing compound of between approximately 0.5 to 1 and 2 to 1 is sufficient to substantially reduce or eliminate atmospheric hydrogen sulfide and dissolved sulfide present in the treated wastewater stream.

Because the wastewater treatment system 400 includes a combined source of nitrate containing compound and alkaline material, it is well suited to smaller wastewater treatment facilities where the costs of raw materials (e.g., nitrate containing compound and alkaline material) do not form an appreciable portion of the operating costs. However, it should be appreciated that the wastewater treatment system 400 may also be used in larger facilities where a less complicated system is preferred, where the parameters of the wastewater stream do not vary significantly, or where a single source of sulfide controlling compounds is either preferred or required (e.g. retrofitting an existing wastewater treatment system).

As discussed above, the wastewater treatment systems 300 and 400 of FIGS. 3 and 4 each includes a controller 320, 420 that receives control signals from the upstream and downstream sensors, and based at least in part upon those signals, adjusts the amount of sulfide controlling compounds added to the wastewater stream. As should be appreciated by those skilled in the art, information other than the control signals received from the upstream and downstream sensors may affect the operation of the controller 320, 420. For example, parameters of an incoming wastewater stream, such as, for example, the flow rate, the pH, the level of atmospheric hydrogen sulfide, and the level of dissolved sulfide of the incoming wastewater stream frequently vary in a cyclical manner (e.g., by day of the week, by time of day, etc.), such that historical data reflecting parameters of the incoming wastewater stream may be used by the controller to predict future parameters. Accordingly, although the operation of the controller is described with respect to control signals received from the upstream and downstream sensors, it should be appreciated that other information may be considered.

According to one embodiment of the present invention, the controller 320, 420 may be implemented using a computer system. The computer system may be, for example, a general-purpose computer such as those based on an Intel PENTIUM®-type processor, a Motorola PowerPC® processor, a Sun UltraSPARC® processor, a Hewlett-Packard PA-RISC® processor, or any other type of processor. Alternatively, the computer system may include specially-programmed, special-purpose hardware, for example, an application-specific integrated circuit (ASIC). One example of a general purpose computer system on which the controller 320, 420 may be implemented is now described with respect to FIG. 1.

The computer system 100 generally includes a processor 103 connected to one or more memory devices 104, such as a disk drive memory, a RAM memory, or other device for storing data. Memory 104 is typically used for storing programs and data during operation of the computer system 100. For example, memory 104 may be used for storing historical data relating to the parameters of the incoming wastewater stream over a period of time, as well as current sensor measurement data. Software, including programming code that implements embodiments of the present invention, is generally stored on a computer readable and/or writeable nonvolatile recording medium (discussed further with respect to FIG. 2), and then copied into memory 104 wherein it is then executed by the processor 103. Such programming code may be written in any of a plurality of programming languages, for example, Java, Visual Basic, C, C#, or C++, Fortran, Pascal, Eiffel, Basic, COBAL, or any of a variety of combinations thereof.

Components of computer system 100 may be coupled by an interconnection mechanism 105, which may include one or more busses (e.g., between components that are integrated within a same machine) and/or a network (e.g., between components that reside on separate discrete machines). The interconnection mechanism enables communications (e.g., data, instructions) to be exchanged between system components of system 100.

Computer system 100 also includes one or more input devices 102, for example, a keyboard, mouse, trackball, microphone, touch screen, and one or more output devices 101, for example, a printing device, display screen, or speaker. In addition, computer system 100 may contain one or more interfaces (not shown) that connect computer system 100 to a communication network (in addition or as an alternative to the network that may be formed by one or more of the components of system 100).

According to one embodiment of the present invention, the one or more input devices 102 may include the sensors for measuring parameters of the incoming and treated wastewater streams (i.e., the upstream and downstream sensors of FIGS. 3 and 4), and the one or more output devices 101 may include the metering valves and/or pumps 355, 365 of FIG. 3, or the metering valve and/or pump 475 of FIG. 4. Alternatively, the upstream sensors, the downstream sensors, the metering valves and/or pumps, or all of these components may be connected to a communication network that is operatively coupled to the computer system 100. For example, the upstream sensors 330, 430 may be configured as input devices that are directly connected to the computer system 100, metering valves and/or pumps 355 and 365, or 475 may be configured as output devices that are directly connected to the computer system 100, and the plurality of downstream sensors may be coupled to another computer system or component so as to communicate with the computer system 100 over a communication network. Such a configuration permits the downstream sensors to be located at a significant distance from the upstream sensors, while still providing sensor data to the computer system 100.

Figure 2:
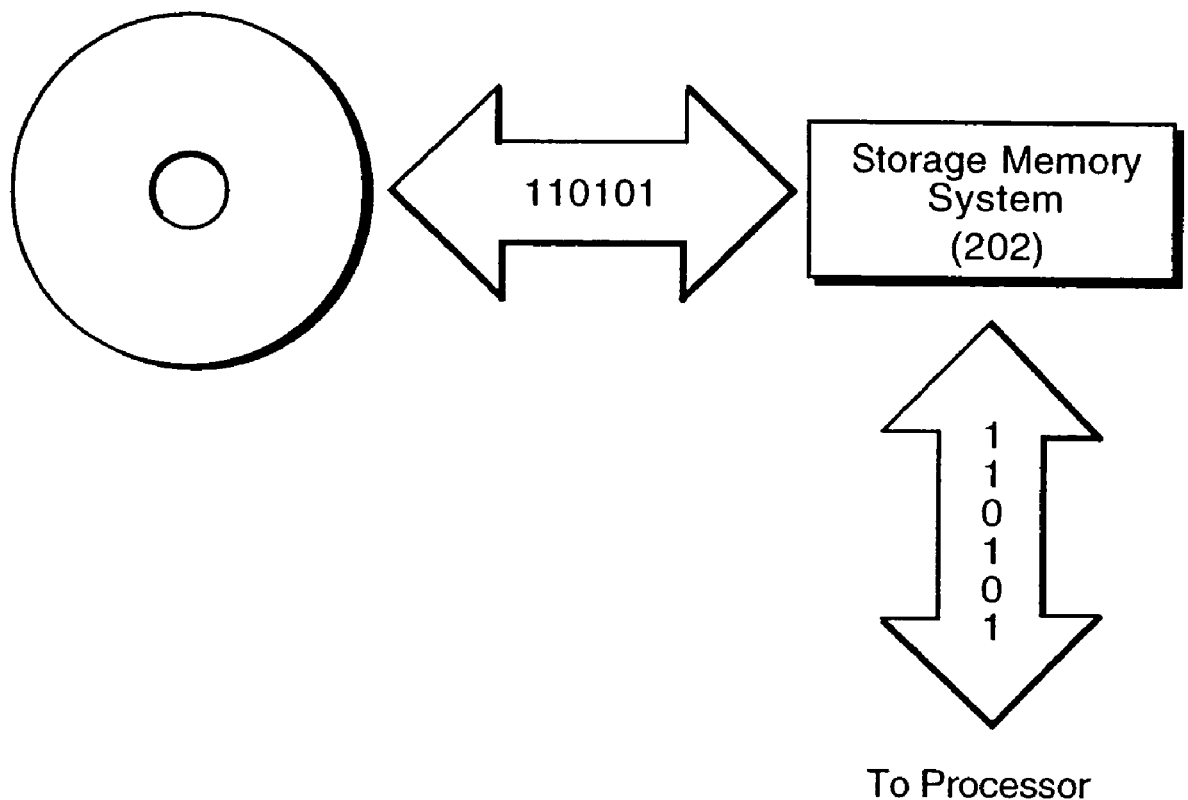
FIG. 2 illustrates a storage system that may be used with the computer system of FIG. 1.

The storage system 106, shown in greater detail in FIG. 2, typically includes a computer readable and/or writeable nonvolatile recording medium 201 in which signals are stored that define a program to be executed by the processor 103. The medium may, for example, be a disk or flash memory. Typically, in operation, the processor 103 causes data, such as code that implements embodiments of the present invention, to be read from the nonvolatile recording medium 201 into another memory 202 that allows for faster access to the information by the processor than does the medium 201. This memory 202 is typically a volatile, random access memory such as a dynamic random access memory (DRAM) or static memory (SRAM), and may be located in storage system 106, as shown, or in memory system 104, not shown.

Although computer system 100 is shown by way of example as one type of computer system upon which various aspects of the invention may be practiced, it should be appreciated that the invention is not limited to being implemented in software, or on the computer system as shown in FIG. 1. Indeed, rather than implemented on a general purpose computer system, the controller may alternatively be implemented as a dedicated system or as a dedicated programmable logic controller (PLC). Further, it should be appreciated that aspects of the invention may be implemented in software, hardware or firmware, or any combination thereof.

Figure 6:
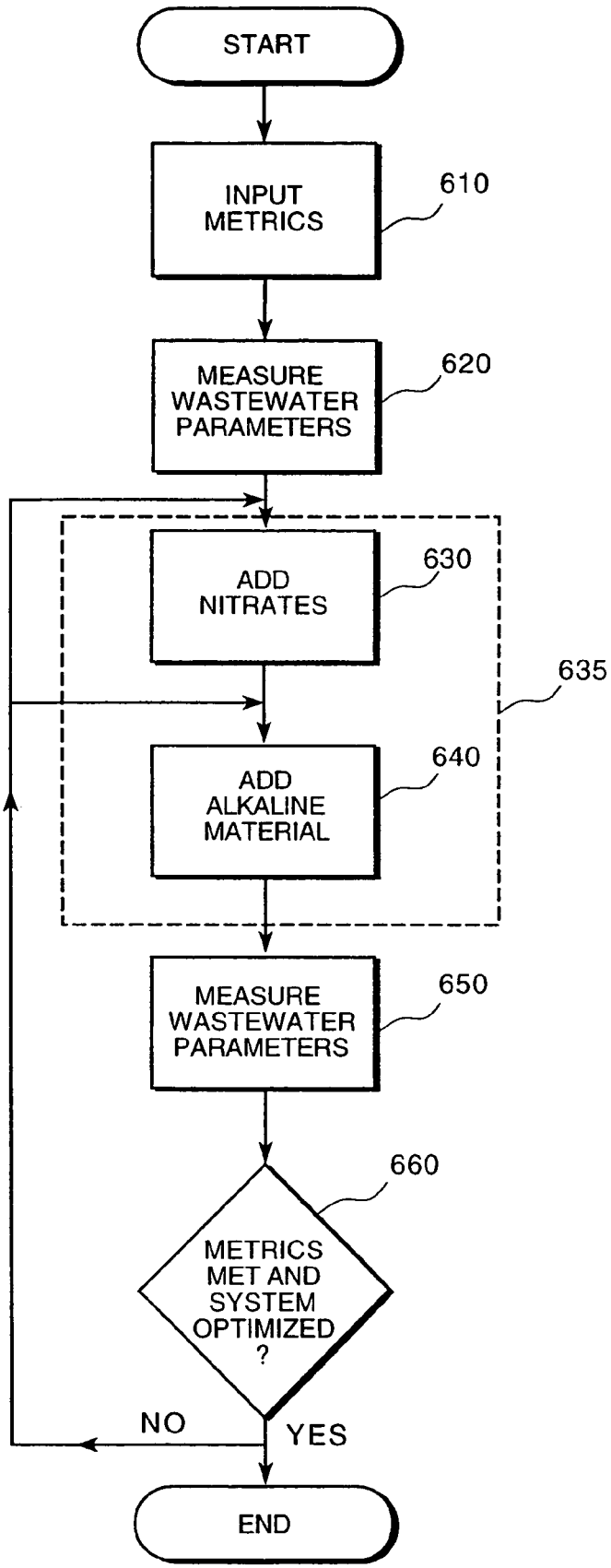
FIG. 6 is a flow chart illustrating a process for the treatment of wastewater according to another embodiment of the present invention.

FIG. 6 is an exemplary flowchart that depicts the operation of a wastewater treatment system 300, 400 according to one illustrative embodiment of the present invention. Although the operation of the wastewater treatment system is described primarily with respect to a wastewater treatment method or routine that may be executed by a controller (e.g., controller 320 of FIG. 3, or controller 420 of FIG. 4), it should be appreciated that the present invention is not so limited, and many of the steps described below may be implemented manually, for example, by a person, rather than by a controller, as discussed in more detail further below.

At step 610, the user is requested to input metrics pertaining to the quality of the treated wastewater stream. For example, the user may be prompted to enter maximum allowed values for the concentration of dissolved sulfides and atmospheric hydrogen sulfide in the treated wastewater stream. Where there are mandated municipal, state, or federal requirements for the treated wastewater stream, or where there are safety or environmental requirements or guidelines pertaining to wastewater streams, the user may enter those values. It should be appreciated that other values may be entered at step 610, for example, the maximum or minimum pH of the treated wastewater stream and/or the estimated flow rate of the wastewater stream, as the present invention is not limited to a particular set of metrics. Moreover, physical parameters of the wastewater stream that may impact the treatment of the wastewater stream, such as the detention time, or the distance between the feed point and the monitoring point may also be entered at step 610. After the user has entered the desired metrics at step 610, the routine proceeds to step 620.

At step 620, the wastewater treatment routine measures various parameters of the incoming wastewater stream, as determined by one or more of the plurality of upstream sensors 330, 430. For example, parameters of the incoming wastewater stream that may be measured at step 620 may include the temperature of the incoming wastewater stream, the pH of the incoming wastewater stream, the concentration of dissolved sulfide and/or atmospheric hydrogen sulfide present in the incoming wastewater stream, or any combination of these parameters. Other parameters that may be measured at step 620 may include, for example, the flow rate of the incoming wastewater stream. The measured parameters of the incoming wastewater stream may be temporarily stored in a volatile memory of the controller (e.g., RAM), and/or stored in a more permanent form of memory of the controller (e.g., storage system 106 in FIG. 1), for example, to use as historical data for effecting operation of the controller, as discussed more fully below.

After measuring parameters of the incoming wastewater stream, the routine proceeds to step 630, wherein the routine determines an amount of nitrate containing compound to be added to the incoming wastewater stream, and then adds that determined amount of nitrate containing compound to the wastewater stream. The amount of nitrate containing compound added at step 630 may be determined as a rate, for example, in gallons per day, or as a percentage of the wastewater flow. After determining the amount of nitrate containing compound to be added to the wastewater stream, the routine then configures the metering valve or pump 355 to provide the determined amount of nitrate containing compound to the wastewater stream.

At step 640, the routine determines an amount of alkaline material to be added to the incoming wastewater stream, and then adds that determined amount of alkaline material to the wastewater stream. The amount of alkaline material added at step 640 may be determined as a rate, for example, in gallons per day, or as a percentage of the wastewater flow. This determination may be based upon either the estimated flow rate, for example, as input at step 610, or the actual flow rate as measured, for example, in step 620.

Although the present invention is not limited to a particular value or range of values of pH for the treated wastewater stream, Applicants have empirically determined that the amount of alkaline material added at step 640 should be sufficient to raise the pH of the wastewater stream by approximately 1 unit of pH, as calculated from titration, assuming a typical pH of the incoming wastewater stream between 6.5 and 7.5 units of pH. Where the incoming flow of wastewater is unusually high or low, the amount of alkaline material added at step 640 should be such that the pH of the treated wastewater stream is between 7 and 9 units of pH, and more preferably between 7.5 and 8.5 units of pH. After determining the amount of alkaline material to be added to the wastewater stream, the routine then configures the metering valve or pump 365 to provide the determined amount of alkaline material to the wastewater stream.

Where the wastewater treatment system does not include separate source of nitrate containing compound and alkaline material, it should be appreciated that steps 630 and 640 may be combined into a single step 635, wherein an amount of a mixture of nitrate containing compound and alkaline material is determined and added to the wastewater stream. For example, the mixture may contain equal volumes of a nitrate containing compound, such as sodium nitrate (at a concentration of approximately 3.1 lbs nitrate/gallon of solution) and a 20%, a 25%, or a 50% caustic solution of sodium hydroxide. The amount of the mixture added at step 635 may be initially based upon the amount of nitrate containing compound to be added, or the amount of alkaline material to be added, as one will necessarily determine the other. After determining the amount of the mixture to be added at step 635, the routine then configures the metering valve or pump 475 to provide the determined amount of the mixture to the wastewater stream.

After either of steps 635 or 640, the wastewater treatment routine proceeds to step 650, wherein various parameters of the treated wastewater stream are measured, as determined by one or more of the plurality of downstream sensors 340, 440. For example, parameters of the treated wastewater stream that may be measured at step 650 generally include the concentration or level of atmospheric hydrogen sulfide present in the treated wastewater stream and the concentration or level of dissolved sulfide present in the treated wastewater stream. Other parameters such as pH and the concentration or level of residual nitrates present in the treated wastewater stream may also be measured. It should be appreciated that where separate sources of nitrate containing compound and alkaline material are used (e.g., wastewater treatment system 300 of FIG. 3), measurement of the pH of the treated wastewater stream and the concentration or level of residual nitrates present in the wastewater stream may allow the amounts of nitrate containing compound and alkaline material to be individually varied and optimized, dependent upon the measured values.

After measuring parameters of the treated wastewater stream, the routine proceeds to step 660, wherein a determination is made as to whether the desired metrics of the treated wastewater stream have been met, and/or whether the system is optimized. It should be appreciated that the determination as to whether the desired metrics of the treated wastewater stream have been met and/or whether the system is optimized may depend on the location of the plurality of downstream sensors 340, 440. For example, where the plurality of downstream sensors 340, 440 are disposed at the control point, this determination may be made by a comparison of the parameters measured at step 650 and the desired metrics for the treated wastewater stream.

Alternatively, where the plurality of downstream sensors are disposed at a significant distance upstream of the control point, this determination may be more complex. For example, where the plurality of downstream sensors are disposed at a significant distance upstream of the control point, further biological activity may be expected to occur, such that the levels of atmospheric hydrogen sulfide and dissolved sulfide at the control point may be greater than those at the monitoring point wherein the parameters of the treated wastewater stream are measured at step 650. Where this is the case, the parameters measured at step 650 may be adjusted (e.g., upward) to reflect values that would be expected at the control point and then compared to the desired metrics, or alternatively, the desired metrics at the control point may be adjusted (e.g., downward) to reflect values that would be expected at the monitoring point. Although the present invention is not so limited, it is generally preferred that the plurality of downstream sensors 340, 440 be disposed at the control point, as the determination made at step 660 is thereby made considerably more precise and less complex.

When it is determined at step 660 that the metrics for the treated wastewater stream have been met and the system is optimized, the routine then terminates. Alternatively, when it is determined that the metrics for the treated wastewater stream have not been met, or that the system is not optimized, the routine returns to step 630 (for a wastewater treatment system that includes separate sources of nitrate containing compound and alkaline material), or step 635 (for a wastewater treatment system that includes a combined source of nitrate containing compound and alkaline material), wherein the amounts of nitrate containing compound, and/or alkaline material, or the amount of nitrate containing material and alkaline material are adjusted in dependence on the parameters measured at step 650. It should be appreciated that dependent upon whether the wastewater treatment includes separate sources of nitrate containing compound and alkaline material, or a combined source of nitrate containing compound and alkaline material, the operation of the system may vary. Accordingly, the operation of the system is first described with a wastewater treatment system that includes separate sources of nitrate containing compounds and alkaline material (e.g., a system similar to that of FIG. 3), and then with respect to a wastewater treatment system that includes a combined source of nitrate containing compound and alkaline material (e.g., a system similar to that of FIG. 4).

Where a wastewater treatment system such as that illustrated in FIG. 3 is used, the amount of nitrate containing compound and the amount of alkaline material added to the incoming wastewater stream may be independently adjusted to meet required metrics for the treated wastewater stream in an economically efficient manner. For example, when it is determined at step 660 that metrics for the levels of dissolved sulfide and atmospheric hydrogen sulfide are met, but appreciable levels of residual nitrate are present in the treated wastewater stream, the amount of nitrate containing compounds added in step 630 may be reduced to further optimize the system. It should be appreciated that the presence of appreciable levels of residual nitrates in the treated wastewater stream indicates that the amount or rate of addition of nitrate containing compound added in step 630 may be reduced while meeting the desired metrics. Of course, as noted previously, whether appreciable levels of residual nitrate are present may depend on the position of the sensor used to measure this parameter. For example, where the sensor used to measure levels of residual nitrate is disposed at the control point, an average level of residual nitrate greater than 1 or 2 mg/L or a peak level of residual nitrate greater than approximately 5 mg/L may indicate that the amount of nitrate added in step 630 may be reduced. Dependent upon whether the pH of the treated wastewater stream, the amount of alkaline material added at step 640 may also be reduced. After modifying the amounts of nitrate containing compound and/or alkaline material added, the routine returns to steps 650 and 660.

Alternatively, when it is determined that metrics for the levels of dissolved sulfide and atmospheric hydrogen sulfide are not met, but little or no residual nitrate is measured in the treated wastewater stream, the amount of nitrates added at step 630 may be increased to further optimize the system. Dependent upon the pH of the treated wastewater stream, the amount of alkaline material added at step 640 may also be increased. After modifying the amounts of nitrate containing compound and/or alkaline material added, the routine returns to steps 650 and 660.

Where metrics for dissolved sulfide are met, but metrics for atmospheric hydrogen sulfide are not, and appreciable levels of residual nitrate are measured in the treated wastewater stream (e.g., an average level above 1 or 2 mg/L, or a peak level above approximately 5 mg/L, as measured at the control point), the amount of alkaline material added in step 630 may be increased to shift the $H_2S$—$HS^-$ equilibrium point to favor $HS^-$, thereby also further increasing the reduction of the residual nitrates by bacteria in the wastewater stream, and further optimizing the system. Alternatively, where metrics for atmospheric hydrogen sulfide are met, and those for dissolved sulfide are not, and appreciable levels of residual nitrate are measured in the treated wastewater stream, the amount of alkaline material added in step 630 may be decreased to shift the $H_2S$—$HS^-$ equilibrium point to favor atmospheric hydrogen sulfide, thereby reducing the level of dissolved sulfide. After modifying the amount alkaline material added at step 630 to either increase or decrease the amount of alkaline material added to the wastewater stream, the routine returns to steps 650 and 660.

Where metrics for the levels of dissolved sulfide and atmospheric hydrogen sulfide are met, little to no residual nitrate is present in the treated wastewater stream, and the treated wastewater has an elevated pH, for example, above 8.5 or 9.0, the amount of alkaline material added at step 640 may be reduced to further optimize the system, as it may be determined that amount of alkaline material added is in excess of that required.

It should be appreciated that the wastewater treatment system described above with respect to FIG. 3 may be readily configured to optimize the amount of nitrate containing compound and alkaline material added to the incoming wastewater stream to meet the desired metrics in a cost effective manner. Although the wastewater treatment system of FIG. 4 may not be as economically efficient as the system of FIG. 3, it may also be configured to meet desired metrics in an efficient manner.

For example, in a wastewater treatment system similar to that of FIG. 4, when it is determined that at step 660 that metrics for the levels of dissolved sulfide and atmospheric hydrogen sulfide are surpassed by a wide margin (i.e., the level of dissolved sulfide and the level of atmospheric hydrogen sulfide are well below the desired levels), the amount of the combined mixture of nitrate containing compound and alkaline material may be reduced. Steps 650 and 660 may then be repeated until the desired metrics are only met or surpassed by a predetermined level, for example, by 10%. Alternatively, when it is determined that metrics for the levels of dissolved sulfide and atmospheric hydrogen sulfide are not met, the amount of combined mixture of nitrate containing compound and alkaline-material may be increased until the metrics are met or exceeded by the predetermined level.

It should be appreciated that the embodiments of wastewater treatment systems illustrated in FIGS. 3 and 4 both utilize feedback control to measure parameters of the treated wastewater stream, and adjust the amount of sulfide controlling compounds added to the incoming wastewater stream based upon those measurements. Accordingly, even if the initial amounts of sulfide controlling compounds added to the incoming wastewater stream are not optimal, the systems will readily adjust to optimal values over time. Further, due to this type of feedback control, both types of systems can respond to changes in the incoming wastewater stream.

Although several of the steps or acts described herein have been described in relation to being implemented on a computer system or stored on a computer-readable medium, it should be appreciated that the present invention is not so limited. Indeed, each of steps 620-660 may be implemented without use of a computer, for example, by an operator. For example, the measuring of the parameters of the incoming and treated wastewater streams may be performed by a human operator, and based upon those parameters, that operator, or another operator may manually adjust the amount of nitrate containing compound, alkaline material, or the combination of nitrate containing compound and alkaline material added to the incoming wastewater stream. Moreover, the determination made at step 660 may be performed by a person, perhaps with the aid of a simple flow chart. Accordingly, although the wastewater treatment routine was described primarily with respect to being implemented on a computer, it should be appreciated that the present invention is not so limited.

It should be appreciated that numerous alterations, modifications, and improvements may be made to the wastewater treatment systems of FIGS. 3 and 4. For example, as discussed above, the parameters of an incoming wastewater stream, such as, for example, the flow rate of the incoming wastewater stream, the temperature and pH of the incoming wastewater stream, and the levels of atmospheric hydrogen sulfide and dissolved sulfide present in the incoming wastewater stream frequently vary in a cyclical manner (e.g., by day of the week, by time of day, etc.). Such historical data reflecting parameters of the incoming wastewater stream may be used by the controller 320, 420 to predict parameters of the incoming wastewater stream at a future time, and adjust the amount of nitrate containing compound, the amount of alkaline material, or the amount of the mixture of nitrate containing compound and alkaline material added to the incoming wastewater stream in dependence thereon. For example, if past historical data indicates that the pH of the incoming wastewater stream varies in a cyclic manner (e.g., similar to that described with respect to Example 5), if the flow of incoming wastewater varies in a cyclic manner, or if the levels of atmospheric hydrogen sulfide or dissolved sulfide vary in a cyclic manner, the amount of the sulfide controlling compound(s) may be varied in anticipation thereof.

Further, it should be appreciated that the operation of the controller 320, 420 may vary depending upon the placement of the upstream sensors 330, 430, and/or the downstream sensors 340, 440 relative to the control point. For example, where the downstream sensors are disposed at the control point and it is determined that the levels of atmospheric hydrogen sulfide and/or dissolved sulfide exceed the desired metrics, it may be too late to increase the amount of sulfide controlling compound(s). Where this is the case, the controller 320, 420 may be modified to respond to changes in the measured parameters of the incoming wastewater stream.

Although the embodiments of FIGS. 3 and 4 have been described as using a plurality of upstream and downstream sensors, it should be appreciated that the present invention is not so limited. For example, rather than requiring any electronic or electro-mechanical sensors, the measurement of levels of atmospheric hydrogen sulfide and dissolved sulfide present in the incoming and/or treated wastewater streams could alternatively be based upon the olfactory senses of an operator. As known to those skilled in the art, humans are generally capable of detecting levels of atmospheric hydrogen sulfide in excess of 50 parts per billion, such that a human operator could be instructed to adjust the amount of sulfide controlling compounds added to the incoming wastewater stream depending upon whether the level of atmospheric hydrogen sulfide was noticeable or not.

EXAMPLES

During a first series of experiments, Applicants observed that when an alkaline material, such as caustic soda, was added to a wastewater stream in a relatively small quantity along with a nitrate containing compound such as BIOXIDE® or BIOXIDE-AQ®, available from United States Filter Corporation, (an odor control chemical containing calcium nitrate or calcium nitrate with anthraquinone, respectively), the resultant effect on both atmospheric hydrogen sulfide and dissolved sulfide was greater than that which would be expected from the combined effect of the two processes acting independently. In particular, there was a synergistic effect in which the concentration both atmospheric hydrogen sulfide and dissolved sulfide was reduced to desired levels, while the amount of nitrate containing compound added to achieve such levels was reduced by as much as 50% relative to levels obtained with nitrate addition alone.

During this first series of experiments, it was further observed that the amount of alkaline material required to elevate the pH of the wastewater stream was substantially less that that which would theoretically be expected. Although this second observation was not confirmed by subsequent experiments, subsequent experiments have confirmed that the co-addition of a nitrate containing compound and an alkaline material significantly reduces the amount of nitrates in any form that need to be added to the wastewater stream to significantly reduce or eliminate dissolved sulfides downstream of the addition point as compared to the amount needed in the absence of the co-addition of alkaline material.

Examples 1 and 2

Two feed sites for introducing nitrate-containing odor control chemicals (BIOXIDE® and BIOXIDE-AQ®, available from United States Filter Corporation) at wastewater pump stations where chosen. Samples of wastewater being pumped were analyzed to determine theoretically how much alkaline material (sodium hydroxide) should be added at the feed sites in order to raise the pH by one unit (calculated to be 126 gallons of 50% caustic soda per one million ($10^6$) gallons of wastewater flow).

Based on these preliminary observations, caustic soda addition equipment was installed at the feed sites, but as a cautionary step the caustic soda addition rates based on the flow from the feed sites was preselected to be at only 50% of the calculated value to raise the pH by one unit. Thus the pH shift was expected to change less than one full pH unit. Surprisingly, however, with the addition of nitrate at traditional dosage (via BIOXIDE® and BIOXIDE-AQ®), a full one unit pH shift was observed downstream (instead of the smaller pH shift that was expected). In addition, the downstream dissolved sulfide and atmospheric hydrogen sulfide ($H_2S$) remained undetectable, while the presence of residual nitrate increased. This data demonstrated an unexpected reduction in nitrate consumption with no increase in downstream dissolved sulfides.

Because of the presence of residual nitrate ions downstream, the dose of the BIOXIDE®/BIOXIDE-AQ® odor control chemicals were reduced. Subsequent field testing revealed good results regarding the undetectability of dissolved sulfide ions and/or atmospheric hydrogen sulfide, but still revealed some presence of residual nitrate ions. The amount of odor control chemical introduced to the wastewater was therefore again reduced and subsequent testing revealed essentially undetected amounts of sulfide ions, hydrogen sulfide and nitrate ions. The test data confirming these observations is tabulated in Tables I and II.

The test data obtained in these field trials revealed that the addition of alkaline material at one-half the theoretical amount calculated to raise the pH of the wastewater stream by a full unit, actually resulted in practice in an increase of the pH by a full unit (instead of the expected smaller change). There was an accompanying substantial reduction in the amount of nitrate and/or nitrate and anthraquinone added to the wastewater while still achieving substantial reduction of dissolved sulfides present in the wastewater stream and atmospheric hydrogen sulfide control at the downstream monitoring point.

TABLE I

Isolated Flow from Lift Station to Downstream Manhole

| Sample No. | Sample Day | 50% NaOH Dosage (GPD) | Nitrate* Dosage (GPD) | pH | Dissolved sulfide (mg/L) | Atmospheric $H_2S$ (ppm) | Residual Nitrate (mg/L) |
|---|---|---|---|---|---|---|---|
| Control 1 | Day 1 | 0.0 | 49 | | | 0.1 | |
| Control 2 | Day 7 | 0.0 | 49 | | | 0.0 | |
| Control 3 | Day 8 | 0.0 | 49 | | | 0.0 | |
| Control 4 | Day 9 | 0.0 | 49 | | | 0.0 | |
| Control 5 | Day 10 | 0.0 | 47.0 | 7.2 | 0.0 | 0.0 | 0.0 |
| 1 | Day 12 | 27.6 | 34.2 | 8.2 | 0.0 | 0.0 | 5.0 |
| 2 | Day 13 | 26.0 | 30.4 | 8.6 | 0.0 | 0.0 | 5.0 |
| 3 | Day 16 | 26.0 | 28.0 | 7.8 | 0.0 | 0.0 | 0.0 |
| 4 | Day 17 | 26.0 | 28.0 | 7.8 | 0.0 | 0.0 | 0.0 |
| 5 | Day 18 | 26.0 | 28.0 | 8.0 | 0.2 | 0.0 | 0.0 |
| 6 | Day 20 | 26.0 | 28.0 | 8.0 | 0.5 | 0.0 | 0.0 |
| 7 | Day 20 | 26.0 | 28.0 | 8.0 | 1.0 | 0.0 | 0.0 |
| 8 | Day 25 | 26.0 | 20.0 | 7.3 | 0.0 | 0.0 | 0.0 |
| 9 | Day 33 | 26.0 | 28.8 | 8.6 | 0.0 | 0.0 | 0.0 |
| 10 | Day 51 | 26.0 | 27.0 | 8.5 | 1.0 | 0.0 | 20.0 |

*BIOXIDE-AQ ® calcium nitrate and anthraquinone odor control chemical, available from United States Filter Corporation.

TABLE II

Combination of Treated and Untreated Flow to Master Pump Station

| Sample No. | Sample Day | 25% NaOH Dosage (GPD) | Nitrate** Dosage (GPD) | pH | Dissolved sulfide (mg/L) | Atmospheric H$_2$S (ppm) | Residual Nitrate (mg/L) |
| --- | --- | --- | --- | --- | --- | --- | --- |
| Control 1 | Day 1 | 0 | 66 | 7.1 | 3 | 80 | 0 |
| Control 2 | Day 29 | 0 | 66 | | 0.4 | 22.7*** | |
| Control 3 | Day 31 | 0 | 66 | | | 20.5**** | |
| Control 4 | Day 32 | 0 | 66 | | | 10.0 | |
| Control 5 | Day 41 | 0 | 65.0 | 6.8 | 0.0 | 0.0 | 0.0 |
| 1 | Day 43 | 21.0 | 65 | 7.1 | 0.0 | 10 | 0.0 |
| 2 | Day 43 | 21.0 | 65 | 7.1 | 0.0 | 0 | 0.0 |
| 3 | Day 44 | 21.0 | 65 | 7.2 | 0.0 | 20.0 | 0.0 |
| 4 | Day 46 | 21.0 | 65 | 5.0 | 3.0 | 20.0 | 0.0 |
| 5 | Day 46 | 21.0 | 42 | 7.1 | 0.0 | 0.0 | 0.5 |
| 6 | Day 46 | 21.0 | 42 | 7.4 | 0.0 | 0.0 | 0.0 |
| 7 | Day 47 | 21.0 | 42 | | | 0.3*** | |
| 8 | Day 48 | 21.0 | 42 | | | 0.3*** | |
| 9 | Day 49 | 21.0 | 42 | | | 0.6*** | |
| 10 | Day 50 | 21.0 | 42 | | | 5.4*** | |
| 11 | Day 51 | 21.0 | 42 | | | 9.1*** | |
| 12 | Day 52 | 21.0 | 42 | | | 7.0*** | |
| 13 | Day 53 | 21.0 | 42 | | | 0.9*** | |
| 14 | Day 66 | 21.0 | 55 | 6.2 | 3.0 | 5.0 | 0.0 |
| 15 | Day 86 | 21.0 | 55 | 6.8 | 10.0 | | |
| 16 | Day 89 | 21.0 | 55 | 7.3 | 0 | 5 | |
| 17 | Day 101 | 21.0 | 55 | 7.0 | 1 | 20 | 0 |
| 18 | Day 155 | 21.0 | 55 | 6.8 | 2 | 30 | 0 |
| Control 6 | Day 178 | 0.0 | 55 | 6.5 | 3 | 120+ | 0 |
| Control 7 | Day 197 | 0.0 | 57.5 | 6.76 | 3 | 25 | 0 |

**BIOXIDE ® odor control chemical, available from United States Filter Corporation.
***24 hour average sampled every 5 minutes by datalogger.
****11 hour average sampled every 5 minutes by datalogger.

Example 3

A series of tests were conducted over a period of 120 days at a wastewater treatment facility. The distance from the feed point (a pump station) to the monitoring point (a discharge manhole) was approximately one mile, plus or minus one-tenth of a mile, with a detention time that was measured (on one occasion) at approximately 90 minutes. During this series of tests, the following parameters were measured twice weekly: pH, atmospheric hydrogen sulfide (H$_2$S), liquid phase sulfide, temperature, and residual nitrate.

Example 3 is divided into nine time periods during which the independent variables (the amount of the nitrate containing compound and the amount of alkaline material) were adjusted and maintained and their effect upon the dependent variables (the level of atmospheric hydrogen sulfide, the level of liquid phase sulfide, and pH) was monitored.

The data of Example 3 demonstrates that the addition of a nitrate containing compound, in combination with the addition of an alkaline material, has a synergistic effect on the prevention and removal of both atmospheric hydrogen sulfide and liquid phase sulfide in a wastewater stream. Specifically, as can be seen by a comparison of the data from time period 3 and time period 7, the addition of an amount of alkaline material enhances the prevention and removal of sulfides from a wastewater stream as compared to a nitrate only treatment of that stream. Further, as can be seen by a comparison of the data from time period 2 and time period 7, the co-addition of an alkaline material allowed a desired concentration of approximately 0.5 to 2 PPM H$_2$S to be achieved at the monitoring point using only about 66% of the amount of nitrate containing compound that was previously required in the absence of the co-addition of alkaline material.

During time period 1 (7 days), it was determined that at the current dosage levels of nitrate containing compound, the amount of atmospheric hydrogen sulfide (H$_2$S) was negligible. Accordingly, the second time period (14 days) was used to optimize the amount of nitrate containing compound added to the wastewater stream, such that a target value of approximately 0.5 to 2 PPM atmospheric H$_2$S was attained. It was determined that the addition of approximately 19 gallons per day (GPD) of nitrate containing compound added to the incoming wastewater stream, without the co-addition of alkaline material resulted in an average level of atmospheric hydrogen sulfide of 1 PPM and within the desired range of 0.5 to 2 PPM.

Time periods 3 (8 days) and 5 (four days) demonstrate that without the co-addition of alkaline material, the addition of less than 19 GPD of the nitrate containing compound was incapable of meeting the desired levels of 0.5 to 2 PPM atmospheric hydrogen sulfide.

Time period 4 (11 days) illustrates the effectiveness of the addition of nitrate containing compounds in the reduction of both atmospheric hydrogen sulfide and liquid phase sulfide levels. During this period of time, mechanical problems were experienced resulting in a substantially reduced amount of nitrate material being added to the wastewater stream. As can be seen from the data in Table III, levels of atmospheric hydrogen sulfide and liquid phase sulfide increased dramatically.

During time period 6 (13 days), and on a flow estimated to be approximately 0.415 MGD, alkaline material (50% sodium hydroxide) was added to the wastewater stream at a rate calculated from titration to be approximately one-half of that required to raise the pH of the wastewater stream by one unit of pH. Although the actual flow of wastewater was approximately 20% higher than the estimated flow used to calculate the rate of addition of nitrate for this time period, the pH of the wastewater stream rose by only approximately 0.2 pH units, far less than the anticipated 0.7 unit rise in pH.

During time period 7, alkaline material was added to the wastewater stream at a rate calculated to raise the pH by one full unit. Although the actual flow of wastewater was approximately 30% higher than the estimated flow used to calculate the rate of addition of nitrate for this time period, the rise in the pH level of the wastewater stream again fell far short of the expected value. Because the rise in the pH level fell well short of that expected in both time periods 6 and 7, Applicants surmise that some of the alkaline material is being consumed by reactions in the wastewater stream.

Time periods 8 (8 days), 9 (3 days) and 10 (21 days) were used as controls to duplicate conditions in earlier time periods. Specifically, time period 8 show results similar to those of time period 6, wherein the amount of alkaline material added was not sufficient to achieve the desired levels of atmospheric hydrogen sulfide. Time period 9 shows results similar to those of time period 2, and time period 10 shows results similar to time period 1 and reestablishes the addition rate of nitrate containing compounds to the wastewater stream.

The data of Example 3 demonstrates that the addition of a nitrate containing compound, in combination with the addition of an alkaline material, has a synergistic effect on the prevention and removal of both atmospheric hydrogen sulfide and liquid phase sulfide in a wastewater stream. Moreover, the relatively modest rise in pH of the treated wastewater stream, as compared to the expected rise in pH calculated from titration, suggests that the alkaline material is used in the denitrification process that results in the removal and/or prevention of sulfides in the wastewater stream. Indeed, as shown by the data from time period 5 and time periods 6-8, levels of liquid phase sulfide were actually reduced due to the co-addition of the alkaline material, thereby demonstrating that the co-addition of alkaline material has a synergistic effect on the reduction of sulfides in a wastewater stream, and not merely that the sulfides were being rendered insoluble due the rise in pH.

TABLE III

Summary Data Table (Period Averages ± Standard Deviation for the Period)

| Time Period | Nitrate Dosage* (GPD) | 50% Caustic Soda Feed (GPD) | Atmospheric $H_2S$ (PPM) | Liquid Phase Sulfide (mg/L) | pH | Flow (MGD) |
|---|---|---|---|---|---|---|
| 1 | 29.2 ± 4.7 | 0.0 | 0.0 ± 0.0 | 0.0 ± 0.0 | 8.0 ± 0.2 | 0.60 ± 0.09 |
| 2 | 19.0 ± 1.4 | 0.0 | 1.0 ± 0.7 | 0.0 ± 0.0 | 8.0 ± 0.1 | 0.55 ± 0.07 |
| 3 | 13.9 ± 0.8 | 0.0 | 4.9 ± 3.4 | 0.7 ± 0.5 | 7.9 ± 0.2 | 0.47 ± 0.09 |
| 4 | 4.3 ± 5.9 | 0.0 | 31.9 ± 24.0 | 3.0 ± 1.6 | 7.9 ± 0.2 | 0.44 ± 0.14 |
| 5 | 12.7 ± 0.2 | 0.0 | 8.5 ± 4.4 | 3.0 ± 0.0 | 7.9 ± 0.3 | 0.53 ± 0.14 |
| 6 | 12.5 ± 0.3 | 7.7 ± 2.6 | 3.6 ± 2.8 | 2.6 ± 1.1 | 8.1 ± 0.2 | 0.48 ± 0.11 |
| 7 | 12.5 ± 0.1 | 18.1 ± 1.0 | 1.1 ± 0.8 | 0.5 ± 0.5 | 8.3 ± 0.3 | 0.54 ± 0.10 |
| 8 | 12.6 ± 0.1 | 10.3 ± 0.4 | 2.8 ± 1.9 | 0.9 ± 0.8 | 8.3 ± 0.1 | 0.83 ± 0.27 |
| 9 | 20.2 ± 1.2 | 0.0 | 3.7 ± 2.3 | 0.5 ± 0.0 | 7.8 ± 0.1 | 0.95 ± 0.09 |
| 10 | 24.2 ± 4.7 | 0.0 | 0.4 ± 0.8 | 0.3 ± 0.2 | 7.9 ± 0.2 | 0.85 ± 0.18 |

*BIOXIDE-AQ ® odor control chemical, United States Filter Corporation. Atmospheric $H_2S$ (PPM) was derived from daily averages from a T82 datalogger recording every five minutes, giving a noon to noon composite. Monitors were deployed for three to four day intervals, calibrated prior to deployment, and bump checked with air and calibration gas upon retrieval. Liquid phase sulfide (mg/L) values were obtained from grab samples collected once every three to four days andanalyzed by the methylene blue method using a LaMotte Kit. PH values were determined using an Extech meter calibrated every Monday. Flow (MGD) was determined from pump times provided by the municipality multiplied by a 775 GPM pump rate.

Example 4

A series of tests were conducted over a period of 36 days at a wastewater treatment facility. The distance from the feed point (a pump station) to the monitoring point was approximately 6.3 miles (33,116 feet) and was formed by a 30 inch diameter conduit having an average daily flow of 4 MGD, or approximately ten times the average daily flow of facility used in Example 3. During this series of tests, the following parameters were measured each weekday: pH, atmospheric hydrogen sulfide ($H_2S$), liquid phase sulfide, temperature, and residual nitrate.

Example 4 is divided into five time periods during which the independent variables (the amount of the nitrate containing compound and the amount of alkaline material) were adjusted and maintained and their effect upon the dependent variables (the level of atmospheric hydrogen sulfide, the level of liquid phase sulfide, and pH) was monitored.

The data of Example 4 again demonstrates that the addition of a nitrate containing compound, in combination with the addition of an alkaline material, has a synergistic effect on the prevention and removal of both atmospheric hydrogen sulfide and liquid phase sulfide in a wastewater stream. Specifically, as can be seen by a comparison of the data from time period 1 and time period 4, the co-addition of an amount of alkaline material reduced atmospheric levels of hydrogen sulfide by 93%, and reduced liquid phase sulfide levels to undetectable levels, utilizing 20% less nitrate containing material as compared to a nitrate only treatment of the wastewater stream. It is believed that further optimization of the amounts of alkaline material and nitrate containing compounds would have been readily achieved had there been additional time for further experimentation.

Time period 1 (9 days) was spent gathering background data. With the addition of nitrate containing compound at a rate of 476 GPD, the average level of atmospheric $H_2S$ was 34 PPM. During time period 2 (10 days), the amount of nitrate containing material was maintained at approximately the same level (within pump variation) and alkaline material was added at a rate of 174 GPD (approximately 43 gallons per million gallons of wastewater). During time period 2, the level of atmospheric hydrogen sulfide was cut in half to 17 PPM, and levels of liquid phase sulfide were reduced significantly.

During time period 3 (2 days), the feed rate of alkaline material was approximately doubled relative to time period 2, while the amount of nitrate containing compound was held approximately constant. At these feed rates, the level of atmospheric hydrogen sulfide was reduced by 86% (to 4.9 PPM) relative to nitrate only treatment, and the level of liquid phase sulfide was reduced 50% relative to nitrate only treatment.

During time period 4 (3 days), the feed rates of both the nitrate containing compound and the alkaline material were reduced by approximately 20% with no adverse consequences to the level of either atmospheric or liquid phase sulfides. In fact, the level of atmospheric and liquid phase sulfides were further reduced relative to time period 3. It is believed that the amounts of alkaline material and nitrate containing compound could have been reduced further with the levels of atmospheric and liquid phase sulfide being maintained at a level comparable to that of time period 1, however numerous problems were experienced during this series of tests, including a significant rain event, mechanical disruptions, and the illness of one of the primary data gatherers which prevented further testing.

During time period 5 (8 days), the addition of alkaline material ceased and the initial rate of addition of the nitrate containing material was resumed.

The data of Example 4 further demonstrates that the addition of a nitrate containing compound, in combination with the addition of an alkaline material, has a synergistic effect on the prevention and removal of both atmospheric hydrogen sulfide and liquid phase sulfide in a wastewater stream. Moreover, the relatively modest rise in pH of the treated wastewater stream suggests that the alkaline material is used in the denitrification process. Specifically, the level of liquid phase sulfide was actually reduced in time period 4 relative to time period 1, thereby supporting the conclusion that the alkaline material is used in the denitrification process, and not that the sulfides were simply being rendered insoluble due the rise in pH.

TABLE IV

Summary Data Table (Period Averages ± Standard Deviation for the Period)

| Time Period | Nitrate Dosage** (GPD) | 50% Caustic Soda Feed (GPD) | Atmospheric $H_2S$ (PPM) | Liquid Phase Sulfide (mg/L) | pH | Rain (in) |
|---|---|---|---|---|---|---|
| 1 | 476 ± 15 | 0.0 | 34 ± 13 | 0.16 ± 0.26 | 7.01 ± 0.12 | 0.17 ± 0.18 |
| 2 | 494 ± 0.1 | 174 ± 65 | 17 ± 8 | 0.03 ± 0.08 | 7.24 ± 0.26 | 0.43 ± 0.58 |
| 3 | 492 ± 0 | 386 | 4.9 ± 3.4 | 0.7 ± 0.5 | 7.99 ± 0.20 | 0.0 ± 0.0 |
| 4 | 377 ± 18 | 333 ± 2 | 2.3 ± 0.3 | 0.0 | 7.55 | 0.35 ± 0.31 |
| 5 | 492 ± 0 | 0.0 | No Data | No Data | 6.91 | 0.42 ± 1.03 |

**BIOXIDE ® odor control chemical, available from United States Filter Corporation. Atmospheric $H_2S$ (PPM) was derived from daily averages from a T82 datalogger or Oda-Log recording every five minutes, thereby giving a 7 AM to 7 AM composite. Monitors were deployed for three to four day intervals, calibrated prior to deployment, and bump checked with air and calibration gas upon retrieval. Liquid phase sulfide (mg/L) values were obtained from grab samplescollected once every three to four days and analyzed by the methylene blue method using a LaMotte Kit.

Example 5

A series of tests were conducted over a period of one month at a wastewater treatment facility. The distance from the feed point (a pump station) to the monitoring point was approximately 3 miles (15,850 feet) and was formed by a 16 inch diameter conduit having an average daily flow of 0.65 MGD. During this series of tests, the following parameters were measured each weekday: pH, atmospheric hydrogen sulfide ($H_2S$), liquid phase sulfide, temperature, and residual nitrate.

Example 5 is divided into five time periods during which the independent variables (the amount of the nitrate containing compound and the amount of alkaline material) were adjusted and maintained and their effect upon the dependent variables (the level of atmospheric hydrogen sulfide, the level of liquid phase sulfide, and pH) was monitored. Due to concerns of the municipality regarding crystallization of the alkaline material (sodium hydroxide), a 25% caustic solution of alkaline material was used instead of the more common 50% caustic solution (to convert to an equivalent volume of 50% caustic solution, divide the values in column 3 of Table V by 2.33).

The data of Example 5 demonstrates that the co-addition of an alkaline material can significantly reduce the amount of nitrate containing compounds added to a wastewater stream to control atmospheric and liquid phase levels of sulfide. This data further shows that where parameters of the incoming wastewater stream vary considerably over time, a simplistic model of proportioning the feed rate of nitrate containing compound to that of the alkaline material may not be economically optimal. In particular, where parameters of the incoming wastewater stream vary considerably over time, the rate of addition of nitrate containing compound and/or the rate of addition of alkaline material may be varied in dependence upon parameters of the incoming wastewater stream to achieve an economically efficient wastewater treatment system.

Time period 1 (3 days) was spent gathering background data, with the addition of nitrate containing compound at a rate of 157 GPD, and an average level of atmospheric $H_2S$ of 0.4 PPM.

During time period 2 (6 days), the rate of addition of nitrate containing material was reduced to approximately 122 GPD and alkaline material was added at a rate of 40 GPD. During time period 2, the level of atmospheric hydrogen sulfide was maintained at 2.1 PPM with levels of liquid phase sulfide being maintained at approximately the same level as time period 1.

During time period 3 (4 days), the feed rate of alkaline material was increased by approximately 63% relative to time period 2 to a level of 65 GPD, and the amount of nitrate containing compound was held approximately constant with no significant change in either the level of atmospheric hydrogen sulfide or pH. At this point, it was noticed that the pH of this wastewater stream was significantly higher than that of most wastewater streams and further, that the pH of this wastewater stream varied considerably during the day, by as much as 1.5 units of pH over a twenty four hour period.

In most wastewater streams, the pH of the untreated wastewater is generally between 6.5 and 7.5, and the variation in pH is generally approximately 0.2 units of pH or less. Because of the great variation in pH, it was determined that the rate of addition of alkaline material should be varied during the day, as it made little sense to add alkaline material to the wastewater stream when the pH was already above 8.0.

Before the planned variation in the addition rate of alkaline material could be implemented, testing was interrupted such that the next time period (time period 4 (8 days)) was spent re-establishing initial conditions with the addition of only the nitrate containing compound. After a further interruption in testing (lasting 3 days), the addition rate of the nitrate containing compound was reduced to 122 GPD and the addition rate of the alkaline material was increased to 70 GPD, with most of the alkaline material being added when the wastewater stream was the most acidic. During this time period 5 (3 days), atmospheric hydrogen sulfide levels were maintained at approximately 3 PPM, using 78% of the amount of nitrate containing compound used in time period 1, and only 69% of the amount of nitrate containing compound used in time period 4.

Although there was an insufficient amount of time to fully optimize the system, it is believed that a further reduction in the levels of atmospheric and liquid phase sulfide, the amount of nitrate containing compound added, and the amount of alkaline material added, could have been achieved had the rate of addition of the alkaline material been reduced during times of high pH, and increased during times of low pH.

The data of Example 5 demonstrates that the co-addition of an alkaline material can significantly reduce the amount of nitrate containing compounds added to a wastewater stream to control atmospheric and liquid phase levels of sulfide. Further, this data also shows that proportioning the feed rate of nitrate containing compound to that of the alkaline material may not be economically optimal where the pH of the wastewater stream varies considerably over a relatively short period of time. In particular, in certain instances, the rate of addition of nitrate containing compound and/or the rate of addition of alkaline material may be independently varied dependent upon parameters of the incoming wastewater stream to achieve an economically efficient wastewater treatment system.

TABLE V

Summary Data Table (Period Averages ± Standard Deviation for the Period)

| Time Period | Nitrate Dosage** (GPD) | 25% Caustic Soda Feed (GPD) | Atmospheric $H_2S$ (PPM) | Liquid Phase Sulfide (mg/L) | pH | Nitrate Residual (mg/L) |
|---|---|---|---|---|---|---|
| 1 | 157 ± 0 | 0.0 | 0.4 ± 1.5 | 0.3 ± 0.3 | 8.3 ± 0.2 | 0.17 ± 0.18 |
| 2 | 122 ± 9 | 40 ± 6 | 2.1 ± 0.1 | 0.5 ± 0.6 | 8.2 ± 0.5 | 21 ± 31 |
| 3 | 118 ± 8 | 65 ± 12 | 2.6 ± 1.8 | 2.5 ± 0.2 | 7.8 ± 0.4 | 1.2 ± 2.0 |
| 4 | 177 ± 0 | 0 | 2.1 ± 2.6 | 0.6 ± 0.6 | 7.9 ± 0.3 | 7 ± 11 |
| 5 | 122 ± 3 | 70.0 ± 0 | 3.1 ± 1.0 | 1.8 ± 0.7 | 8.4 ± 0.1 | 3.6 ± 3.1 |

**BIOXIDE ® odor control chemical, available from United States Filter Corporation. Atmospheric $H_2S$ (PPM) was derived from daily averages from a T82 datalogger or Oda-Log recording every five minutes, thereby giving a midnight to midnight composite. Monitors were deployed for three to four day intervals, calibrated prior to deployment, and bump checked with air and calibration gas upon retrieval. Liquid phase sulfide (mg/L) values were obtained from grab samplescollected once every three to four days and analyzed by the methylene blue method using a LaMotte Kit.

Example 6

A series of tests were conducted over a period of approximately four months at a wastewater treatment facility. The data of Example 6 clearly demonstrates that the addition of a nitrate containing compound, in combination with the addition of an alkaline material, has a synergistic effect on the prevention and removal of both atmospheric hydrogen sulfide and liquid phase sulfide in a wastewater stream. In particular, as a comparison of time periods 3 and 5 shows, the level of liquid phase hydrogen sulfide can be reduced by over 60% and the level of atmospheric hydrogen sulfide can be reduced by approximately 30% by the addition of alkaline material as compared to nitrate only treatment. Further, these results are achieved with a reduction in the amount of nitrate containing compound of over 32% relative to nitrate only treatment.

Figure 5:
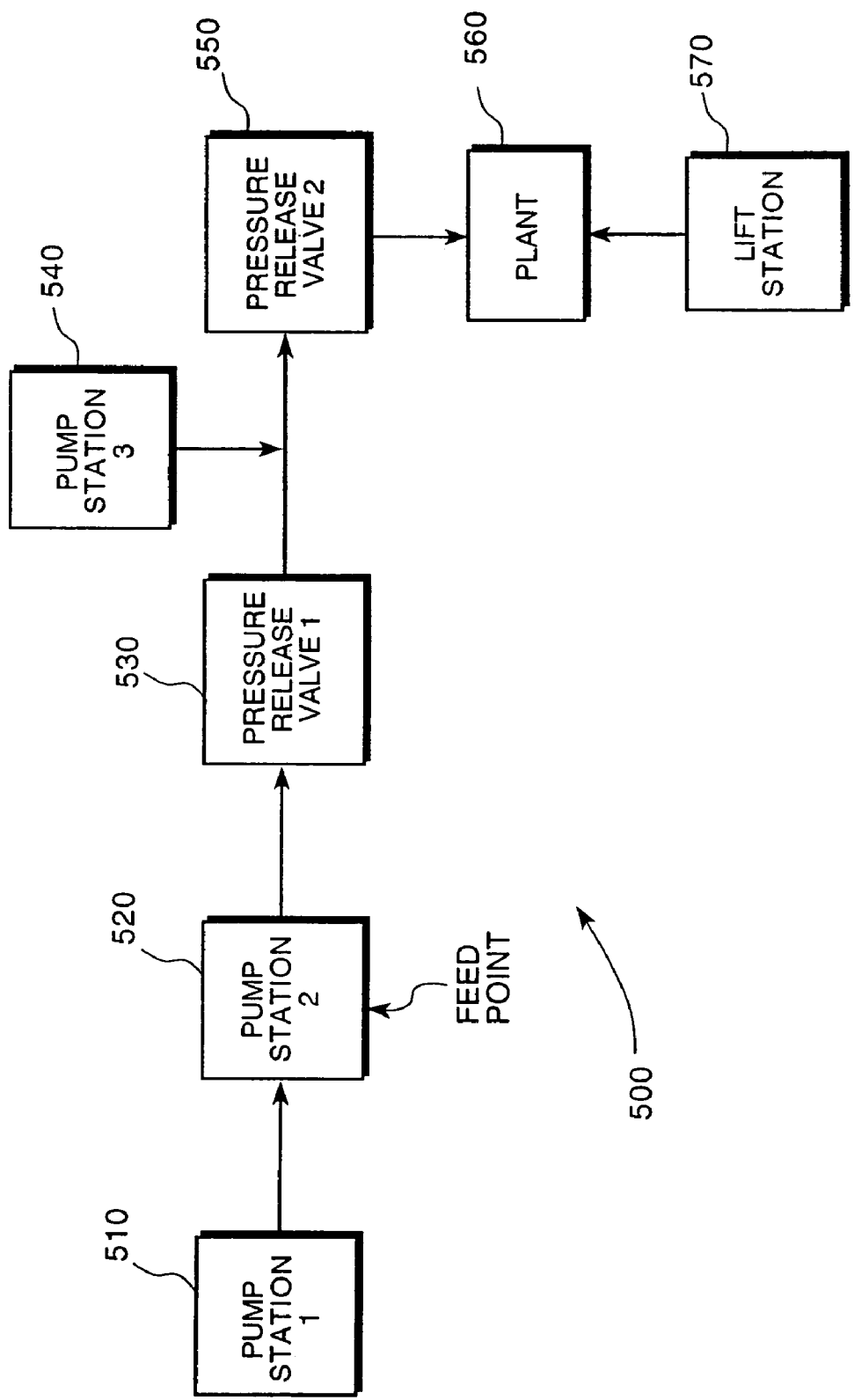
FIG. 5 illustrates the layout of a wastewater treatment system from which certain experimental test data was collected.

The general physical layout of this treatment facility is now described with respect to FIG. 5. As depicted in FIG. 5, wastewater from pump station 1 510 and pump station 2 520 travels along a conduit approximately 2 miles to a pressure release valve 1 530. Shortly after the pressure release valve 1 530, this flow is merged with a flow from pump station 3 540, and the combined flow travels approximately 2 miles further past pressure release valve 2 550 and to the treatment plant 560. At the treatment plant 560, this flow is merged with a flow of wastewater from lift station 570, and the combined flow is treated to reduce levels of atmospheric and liquid phase sulfide. The total flow of wastewater received and treated at the plant 560 is approximately 1.5 MGD, with approximately 1.1 MGD being received from the north, and approximately 0.8 MGD of that flow passing through pressure release valve 1 530.

Prior to treatment using nitrate containing compounds and alkaline material, levels of atmospheric hydrogen sulfide in excess of 2000 PPM were frequently measured at lift station 570. Treatment with ODOPHOS™ odor, corrosion, and fume control, approximately 100 feet prior to the lift station 570 and the installation of a scrubber at the lift station alleviated the worst odor problem at the lift station 570, yet at the treatment plant 560 where flow from the south was combined with the flow from the north, odor problems continued with peak levels of atmospheric hydrogen sulfide exceeding 1000 PPM. The goal of this series of tests was to reduce the levels of liquid phase sulfide to below 10 mg/L.

During this series of tests, amounts of nitrate containing compound and/or alkaline material were added at pump station 2 520 (i.e., the feed point) and the following parameters were measured twice each week at both pressure release valve 1 530 and at the treatment plant 560 (the monitoring points): pH, atmospheric hydrogen sulfide ($H_2S$), liquid phase sulfide, temperature, and residual nitrate. The data of Example 6 is divided into five time periods during which the independent variables (the amount of the nitrate containing compound and the amount of alkaline material) were adjusted and maintained and their effect upon the dependent variables (the level of atmospheric hydrogen sulfide, the level of liquid phase sulfide, and pH) was monitored.

Time period 1 (15 days) was spent gathering background data in the absence of the addition of nitrate containing compound and alkaline material. In the absence of treatment, levels of liquid phase sulfide at PRV 1 (pressure release valve 1) were 23 mg/L, and levels of liquid phase sulfide and atmospheric hydrogen sulfide at the treatment plant were 29 mg/L and 123 PPM, respectively.

During time period 2 (32 days), the nitrate containing compound was added at a constant rate of 96 GPD with no addition of alkaline material. During this time period, the levels of liquid phase sulfide at both PRV1 and the treatment plant were reduced in half, with the level of atmospheric hydrogen sulfide at the treatment plant being reduced to approximately 117 PPM.

During time period 3 (26 days), the feed rate of nitrate containing compound was increased to approximately 150 GPD with no addition of alkaline material. At this feed rate, the level of liquid phase sulfide was reduced to 5 mg/L at PRV 1, and to 9 mg/L at the treatment plant. The level of atmospheric hydrogen sulfide at the treatment plant was reduced 30% relative to the untreated flow.

During time period 4 (8 days), the feed rate of the nitrate containing compound was maintained (within pump variation) at the same level as time period 3, but alkaline material was added at a constant rate of 19 GPD. During this time period, liquid phase levels of sulfide at PRV 1 were cut nearly in half, and those at the treatment plant were cut by two thirds relative to treatment with only the nitrate containing compound (i.e. relative to time period 3). Relative to no treatment (i.e. time period 1), levels of liquid phase sulfides at PRV 1 and the treatment plant were reduced by over 87%, and levels of atmospheric hydrogen sulfide at the treatment plant were reduced by over 66%.

During time period 5 (19 days), the feed rate of nitrate containing compound was reduced by approximately 34% and the feed rate of alkaline material was increased to 50 GPD. As can be seen by a comparison of the data from time periods 4 and 5, despite a significant reduction in the amount of nitrate containing compound, atmospheric and liquid phase levels of sulfides remained essentially the same at the treatment plant, and the level of liquid phase hydrogen sulfide at PRV 1 was reduced to 0.06 mg/L. It is believed that a further reduction in the amount of nitrate containing compound and/or the amount of alkaline material could have been achieved, as the measured level of liquid phase sulfide at the treatment plant was well below the goal of 10 mg/L.

The data of Example 6 clearly demonstrates that the addition of a nitrate containing compound, in combination with the addition of an alkaline material, has a synergistic effect on the prevention and removal of both atmospheric hydrogen sulfide and liquid phase sulfide in a wastewater stream. In particular, as a comparison of time periods 3 and 5 shows, the level of liquid phase hydrogen sulfide can be reduced by over 60%, the level of atmospheric hydrogen sulfide can be reduced by approximately 30%, and the amount of nitrate containing compound can be reduced over 32% by the co-addition of alkaline material as compared to nitrate only treatment. Further, the synergistic effect on both liquid phase levels and atmospheric levels of hydrogen sulfide was not limited to immediate vicinity of the treatment, but extended significantly downstream of the feed point.

TABLE VI

Summary Data Table (Period Averages ± Standard Deviation for the Period)

| Time Period | Nitrate Dosage** (GPD) | 50% Caustic Soda Feed (GPD) | PRV 1 Liquid Phase Sulfide (mg/L) | PRV 1 pH | Plant Liquid Phase Sulfide (mg/L) | Plant pH | Plant Atmospheric $H_2S$ (PPM) |
|---|---|---|---|---|---|---|---|
| 1 | 0 | 0 | 23 ± 5 | 7.2 ± 0.1 | 29 ± 3 | 7.0 ± 0.1 | 123 ± 46 |
| 2 | 96 ± 9 | 0 | 12 ± 13 | 7.4 ± 0.3 | 15 ± 10 | 7.1 ± 0.1 | 117 ± 30 |
| 3 | 149 ± 3 | 0 | 5 ± 7 | 7.1 ± 0.2 | 9 ± 6 | 6.9 ± 0.1 | 87 ± 40 |

TABLE VI-continued

Summary Data Table (Period Averages ± Standard Deviation for the Period)

| Time Period | Nitrate Dosage** (GPD) | 50% Caustic Soda Feed (GPD) | PRV 1 Liquid Phase Sulfide (mg/L) | PRV 1 pH | Plant Liquid Phase Sulfide (mg/L) | Plant pH | Plant Atmospheric H$_2$S (PPM) |
|---|---|---|---|---|---|---|---|
| 4 | 146 ± 1 | 19.3 ± 0.3 | 3 ± 3 | 7.5 ± 0.2 | 3 ± 4 | 7.0 ± 0.3 | 54 ± 10 |
| 5 | 101 ± 2 | 49.8 ± 0.4 | 0.06 ± 0.12 | 7.8 ± 0.5 | 3 ± 2 | 7.3 ± 0.1 | 60 ± 18 |

**BIOXIDE ® odor control chemical, available from United States Filter Corporation. Atmospheric H$_2$S (PPM) was derived from daily averages from a T82 datalogger or OdaLog recording every five minutes, giving a midnight to midnight composite. Monitors were deployed for three to four day intervals, calibrated prior to deployment, and bump checked with air and calibration gas upon retrieval. Liquid phase sulfide (mg/L) values were obtained from grab samples collected onceevery three to four days and analyzed by the methylene blue method using a LaMotte Kit.

The above-described embodiments of the present invention can be implemented in any of numerous ways. For example, the above-discussed functionality for reducing the level of atmospheric hydrogen sulfide and/or the level of liquid phase sulfide can be implemented using hardware, software or a combination thereof. When implemented in software, the software code can be executed on any suitable processor. It should further be appreciated that any single component or collection of multiple components of the computer system that perform the functions described above can be generically considered as one or more controllers that control the above-discussed functions. The one or more controllers can be implemented in numerous ways, such as with dedicated hardware, or using a processor that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer system resource to implement the aspects of the present invention discussed herein. In addition, it should be appreciated that the reference to a computer program which, when executed, performs the above-discussed functions, is not limited to an application program running on the host computer. Rather, the term computer program is used herein in a generic sense to reference any type of computer code (e.g., software or microcode) that can be employed to program a processor to implement the above-discussed aspects of the present invention.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any means, known now or later developed, for performing the recited function.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The invention claimed is:

1. A computer readable medium encoded with a program that, when executed on a processor of a computer, performs a method of treating a wastewater stream, comprising acts of:
   (a) adding a nitrate containing compound at a first position in the wastewater stream;
   (b) adding an alkaline material at a second position in the wastewater stream;
   (c) sensing a level of at least one of atmospheric hydrogen sulfide, dissolved sulfide, and residual nitrate in the wastewater stream downstream of the first and second positions; and
   (d) adjusting an amount of at least one of the nitrate containing compound and the alkaline material added to the wastewater stream in response to the act of sensing.

2. The computer readable medium of claim 1, wherein the act (b) includes an act of adding the alkaline material in an amount sufficient to raise a pH of the wastewater stream downstream of the first and second positions by approximately one unit of pH.

3. The computer readable medium of claim 1, wherein the act (b) includes an act of adding the alkaline material in an amount sufficient to raise a pH of the wastewater stream downstream of the first and second positions to between approximately 7.5 and 8.5 units of pH.

4. The computer readable medium of claim 1, wherein the act (c) includes an act of sensing the level of atmospheric hydrogen sulfide and the level of dissolved sulfide in the wastewater stream downstream of the first and second positions, and wherein the act (d) includes an act of increasing an amount of the nitrate containing compound added in act (a) when the level of at least one of atmospheric hydrogen sulfide and dissolved sulfide sensed in act (c) is greater than a desired level.

5. The computer readable medium of claim 1, wherein the act (c) includes an act of sensing the level of atmospheric hydrogen sulfide and the level of dissolved sulfide in the wastewater stream downstream of the first and second positions, and wherein the act (d) includes an act of increasing an amount of the alkaline material added in act (b) when the level of at least one of atmospheric hydrogen sulfide and dissolved sulfide sensed in act (c) is greater than a desired level.

6. The computer readable medium of claim 1, wherein the act (c) includes an act of sensing the level of atmospheric hydrogen sulfide and the level of dissolved sulfide in the wastewater stream downstream of the first and second positions, and wherein the act (d) includes acts of increasing an amount of the nitrate containing compound added in act (a) and increasing an amount of the alkaline material added in act (b) when the level of atmospheric hydrogen sulfide and the level of dissolved sulfide sensed in act (c) are greater than a desired level.

7. The computer readable medium of claim 1, wherein the act (c) includes an act of sensing the level of atmospheric hydrogen sulfide and the level of dissolved sulfide in the wastewater stream downstream of the first and second positions, and wherein the act (d) includes an act of decreasing an amount of the nitrate containing compound added in act (a) when the level of at least one of atmospheric hydrogen sulfide and dissolved sulfide sensed in act (c) is less than a desired level.

8. The computer readable medium of claim 1, wherein the act (c) includes an act of sensing the level of atmospheric hydrogen sulfide and the level of dissolved sulfide in the wastewater stream downstream of the first and second positions, and wherein the act (d) includes an act of decreasing an amount of the alkaline material added in act (b) when the level of at least one of atmospheric hydrogen sulfide and dissolved sulfide sensed in act (c) is less than a desired level.

9. The computer readable medium of claim 1, wherein the act (c) includes an act of sensing the level of atmospheric hydrogen sulfide and the level of dissolved sulfide in the wastewater stream downstream of the first and second positions, and wherein the act (d) includes acts of decreasing an amount of the nitrate containing compound added in act (a) and decreasing an amount of the alkaline material added in act (b) when the level of atmospheric hydrogen sulfide and the level of dissolved sulfide sensed in act (c) are less than a desired level.

10. The computer readable medium of claim 1, wherein the act (c) includes an act of sensing the level of atmospheric hydrogen sulfide, the level of dissolved sulfide, and the level of residual nitrate in the wastewater stream downstream of the first and second positions, and wherein the act (d) includes an act of decreasing an amount of the nitrate containing compound added in act (a) when the level of atmospheric hydrogen sulfide and the level of dissolved sulfide sensed in act (c) are less than a desired level and an average level of residual nitrate sensed in act (c) is approximately 1-2 mg/L or greater.

11. The computer readable medium of claim 10, further comprising acts of:
(e) sensing a pH of the wastewater stream at or prior to the second position; and
(f) sensing a pH of the wastewater stream downstream of the first and second positions.

12. The computer readable medium of claim 11, wherein the act (d) further includes an act of decreasing an amount of the alkaline material added in act (b) when the act (f) indicates that the pH of the wastewater downstream of the first and second positions is at least one unit of pH higher than the pH of the wastewater stream sensed in act (e).

13. The computer readable medium of claim 1, wherein the act (c) includes an act of sensing the level of atmospheric hydrogen sulfide, the level of dissolved sulfide, and the level of residual nitrate in the wastewater stream downstream of the first and second positions, and wherein the act (d) includes an act of decreasing an amount of the alkaline material added in act (b) when the level of atmospheric hydrogen sulfide sensed in act (c) is less than a first desired level, the level of dissolved sulfide sensed in act (c) is greater than a second desired level, and an average level of residual nitrate sensed in act (c) is approximately 1-2 mg/L or greater.

14. The computer readable medium of claim 1, wherein the act (c) includes an act of sensing the level of atmospheric hydrogen sulfide, the level of dissolved sulfide, and the level of residual nitrate in the wastewater stream downstream of the first and second positions, and wherein the act (d) includes an act of increasing an amount of the alkaline material added in act (b) when the level of atmospheric hydrogen sulfide sensed in act (c) is greater than a first desired level, the level of dissolved sulfide sensed in act (c) is less than a second desired level, and an average level of residual nitrate sensed in act (c) is approximately 1-2 mg/L or greater.

15. The computer readable medium of claim 1, further comprising acts of:
(e) sensing a pH of the wastewater stream at or prior to the second position; and
(f) sensing a pH of the wastewater stream downstream of the first and second positions.

16. The computer readable medium of claim 15, wherein the act (c) includes an act of sensing the level of atmospheric hydrogen sulfide and the level of dissolved sulfide in the wastewater stream downstream of the first and second positions, and wherein the act (d) includes an act of decreasing an amount of the alkaline material added in act (b) when the level of atmospheric hydrogen sulfide and the level of dissolved sulfide sensed in act (c) are less than a desired level, and the act (f) indicates that the pH of the wastewater downstream of the first and second positions is at least one unit of pH higher than the pH of the wastewater stream sensed in act (e).

17. The computer readable medium of claim 15, wherein the act (c) includes an act of sensing the level of atmospheric hydrogen sulfide, the level of dissolved sulfide, and the level of residual nitrate in the wastewater stream downstream of the first and second positions, and wherein the act (d) includes an act of decreasing an amount of the alkaline material added in act (b) when the level of atmospheric hydrogen sulfide and the level of dissolved sulfide sensed in act (c) are less than a desired level, the level of residual nitrate sensed in act (c) is negligible, and the act (f) indicates that the pH of the wastewater downstream of the first and second positions is at least one unit of pH higher than the pH of the wastewater stream sensed in act (e).

* * * * *